(12) United States Patent
Johnson et al.

(10) Patent No.: US 7,631,834 B1
(45) Date of Patent: Dec. 15, 2009

(54) AERIAL ROBOT WITH DISPENSABLE CONDUCTIVE FILAMENT

(75) Inventors: Samuel Alan Johnson, Loveland, CO (US); William Dennis Burkard, Longmont, CO (US); Robert H. Mimlitch, III, Rowlett, TX (US); Robert Henry Mimlitch, Jr., West Tawakoni, TX (US); David Anthony Norman, Greenville, TX (US)

(73) Assignee: Stealth Robotics, LLC, Longmont, CO (US)

( * ) Notice: Subject to any disclaimer, the term of this patent is extended or adjusted under 35 U.S.C. 154(b) by 0 days.

(21) Appl. No.: 11/737,591

(22) Filed: Apr. 19, 2007

Related U.S. Application Data

(63) Continuation-in-part of application No. 11/361,122, filed on Feb. 24, 2006, now Pat. No. 7,510,142.

(51) Int. Cl.
*B64C 27/08* (2006.01)
*B64C 29/00* (2006.01)
*B64C 39/00* (2006.01)
*B64C 27/00* (2006.01)

(52) U.S. Cl. .................. 244/17.17; 244/3.1; 244/17.11; 244/17.19; 244/17.21; 244/17.23; 244/75.1; 244/76 R; 244/175

(58) Field of Classification Search ........... 244/3.1–3.3, 244/6–7 C, 12.1–12.6, 17.11–17.27, 23 R–23 D, 244/76 R, 175, 189, 190, 75.1; 342/5–20, 342/52–58, 61–67; 446/30–45
See application file for complete search history.

(56) References Cited

U.S. PATENT DOCUMENTS 2,953,321 A 9/1960 Robertson et al.

(Continued)

FOREIGN PATENT DOCUMENTS

DE 198 08 777 A1 9/1999

(Continued)

OTHER PUBLICATIONS

Gore, "Gore™Shielded Twisted Pair. Controlled Impedance Wire," datasheet, publication JK060427-05; last revision Jun. 29, 2007, 2 pages, online, <http://www.gore.com/MungoBlobs/845/81/controlled_impedance.pdf>, retrieved Jun. 6, 2008.

(Continued)

*Primary Examiner*—Bernarr E Gregory
(74) *Attorney, Agent, or Firm*—Fish & Richardson P.C.

(57) ABSTRACT

This disclosure involves aerial robots that dispenses conductive filament or systems, methods, and software for support such aerial robots. One remotely powered aerial robot system includes an aerial robot and a power source. The aerial robot comprises a body, a first propeller coupled to the body and operable to provide thrust to the aerial robot, a rotatable spool coupled to the body, and a conductive filament that is dispensed from the spool by rotation of the spool is one direction and retrieved by rotation of the spool in another direction. The power source is coupled with, and remote from, the aerial robot via the conductive filament, where the conductive filament is operable to power the first propeller using power from the power source.

29 Claims, 13 Drawing Sheets

U.S. PATENT DOCUMENTS

| | | | |
|---|---|---|---|
| 2,995,740 A | | 8/1961 | Schreckengost |
| 2,996,269 A | | 8/1961 | Parry |
| 3,053,480 A | | 9/1962 | Vanderlip |
| 3,053,481 A | * | 9/1962 | Wyatt ..................... 244/17.17 |
| 3,176,288 A | | 3/1965 | Wyatt |
| 3,381,922 A | * | 5/1968 | Laing ..................... 244/17.17 |
| 3,618,259 A | * | 11/1971 | Voorhis ....................... 446/33 |
| 3,919,805 A | * | 11/1975 | Stanzel ....................... 446/33 |
| 3,991,512 A | * | 11/1976 | Stanzel ....................... 446/33 |
| 4,133,139 A | * | 1/1979 | Stanzel ....................... 446/31 |
| 4,233,605 A | | 11/1980 | Coleman |
| 4,478,379 A | | 10/1984 | Kerr |
| 4,573,937 A | * | 3/1986 | Stanzel ....................... 446/31 |
| 4,795,111 A | | 1/1989 | Moller |
| 4,808,999 A | | 2/1989 | Toman |
| 5,070,955 A | | 12/1991 | Lissaman et al. |
| 5,072,396 A | | 12/1991 | Fitzpatrick et al. |
| 5,152,478 A | | 10/1992 | Cycon et al. |
| 5,208,757 A | | 5/1993 | Appriou et al. |
| 5,289,994 A | | 3/1994 | Del Campo Aguilera |
| 5,295,643 A | | 3/1994 | Ebbert et al. |
| 5,419,513 A | | 5/1995 | Flemming, Jr. et al. |
| 5,709,580 A | * | 1/1998 | Stanzel ....................... 446/31 |
| 5,722,618 A | | 3/1998 | Jacobs et al. |
| 5,752,088 A | | 5/1998 | Desselle |
| 5,757,157 A | | 5/1998 | Falk et al. |
| 5,779,190 A | | 7/1998 | Rambo et al. |
| 6,086,014 A | | 7/2000 | Bragg, Jr. |
| 6,170,778 B1 | | 1/2001 | Cycon et al. |
| 6,325,330 B1 | | 12/2001 | Lavan, Jr. |
| 6,364,253 B1 | | 4/2002 | Cavanagh |
| 6,567,044 B2 | | 5/2003 | Carroll |
| 6,845,939 B1 | | 1/2005 | Baldwin |
| 6,931,247 B2 | | 8/2005 | Cox et al. |
| 6,933,965 B2 | | 8/2005 | Heafitz |
| 7,039,367 B1 | | 5/2006 | Kucik |
| 7,097,137 B2 | | 8/2006 | McDonnell |
| 2004/0167682 A1 | | 8/2004 | Beck et al. |
| 2006/0284002 A1 | | 12/2006 | Stephens et al. |
| 2007/0108345 A1 | | 5/2007 | McDonnell |

FOREIGN PATENT DOCUMENTS

| EP | 0 762 074 A | 3/1997 |
|---|---|---|

OTHER PUBLICATIONS

Notification of Transmittal of The International Search Report and The Written Opinion of the International Searching Authority of Application No. PCT/US2008/060799 filed Apr. 18, 2008 and mailed Mar. 2, 2009 (15 pages).

Franchi La P., "*Tether Cable Offers Lines for Research Australia Backs Study to Explore Airborne Payload Delivery*", Flight Internationak Reed Business Information, Sutton Surrey, GB vol. 166, No. 4955, Oct. 12, 2004, p. 30, XP001201173.

* cited by examiner

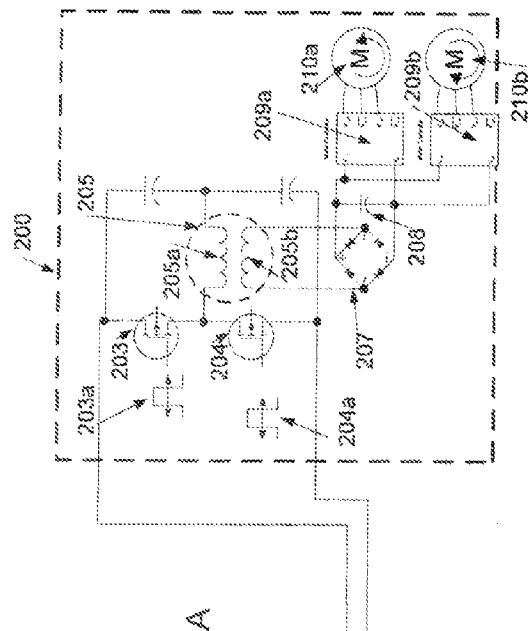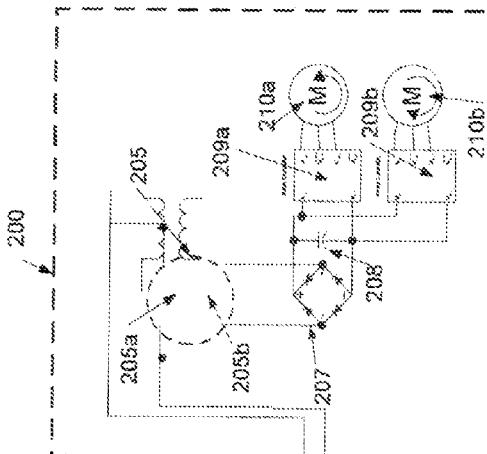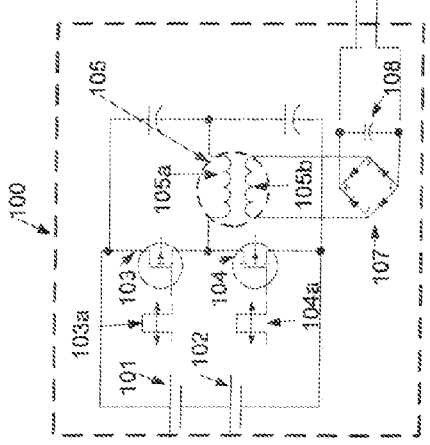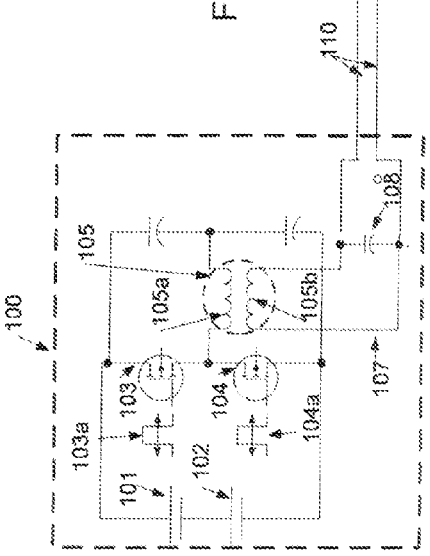
FIG. 9A
FIG. 9B

US 7,631,834 B1

AERIAL ROBOT WITH DISPENSABLE CONDUCTIVE FILAMENT

RELATED APPLICATIONS

This application is a continuation-in-part, and claims the benefit of priority under 35 U.S.C. §120, of U.S. application Ser. No. 11/361,122, filed Feb. 24, 2006 now U.S. Pat. No. 7,510,142.

TECHNICAL FIELD

The present disclosure relates generally to the field of unmanned aerial vehicles (UAVs), aerostats, lighter-than-air ships, and other such aerial robots with (perhaps easily) dispensable filament that can provide at least some of the power to the aerial robots.

BACKGROUND

Remotely controlled aerial observational and broadcasting platforms or UAVs are known to provide video and infrared observation and surveillance of persons, industrial equipment, and security environments. UAVs are sometimes used by military and governmental agencies to survey large territories by air. Some UAVs operate over ranges extending thousands of miles. However, conventional UAVs operate like airplanes and therefore fly at moderate to high speeds. It is difficult or impossible for conventional UAVs to park in a stationary position over an observed area for extended periods. In some cases, radio-controlled model helicopters, fitted with wireless cameras, have been used for close inspection, but they can only hover for limited periods. Fuel capacity limits flight time for conventional UAVs, and radio-controlled helicopters normally require highly skilled human pilots on the ground with a clear line of sight. In addition, radio-controlled helicopters are vulnerable to wind gusts, and can be easily destroyed by a rotor strike. Similarly, conventional aerostats, or lighter-than-air-ships, have the ability to remain aloft for extended periods. However, aerostats are typically large and unwieldy. Moreover, aerostats are greatly affected by winds aloft, and lack maneuverability.

Conventional UAVs rely on wireless radio communication technologies for command, control, and data transmission. However, radio communications are susceptible to intentional and unintentional jamming and may be easily compromised by persons of modest equipment desiring to intercept the broadcast information and data. Radio communication also provides a limited bandwidth capacity for data transfer. In addition, conventional UAVs are typically not well suited for use in confined spaces. For example, a typical UAV is not operational through small passageways such as indoor halls, ductworks, caves, and crevices.

SUMMARY

Specifically, some of the principles described herein relate to aerial robots, some embodiments of which may be suited for remote observation, environment detection, device delivery, communication, and other applications.

One embodiment provides an apparatus comprising an aerial robot. The aerial robot comprises a first propeller for rotating in a first direction, a second propeller rotating in a second direction opposite of the first direction, and an observation device. The apparatus includes a power supply and a transmission line interconnecting the power supply and the aerial robot. The transmission line can transmit power to the aerial robot and provides bi-directional communication to and from the aerial robot. In various embodiments, the transmission line can comprise i) a controlled impedance wire or ii) an electrical power line and an optical fiber communication line. In one embodiment, the aerial robot further comprises an internal spool, where at least a portion of the transmission line is wound on the internal spool or where at least a portion of the electrical transmission line is wound on the internal spool and the transmission line comprises a tether wire pair. A nominal diameter of each wire of the tether wire pair can be 0.010 inches or less and is covered with a dielectric insulator. The transmission line may provide power to the aerial robot at a voltage of 500V or higher or 1000V or higher. In one configuration, the aerial robot further comprises an internal duct comprising an inlet and an outlet. The first and second propellers are disposed in the internal duct and first and second movable air foils at the outlet of the internal duct control movement of the aerial robot. In various configurations, the aerial robot and the power supply each comprises a spool connected to the transmission line, and at least one of the spools is powered.

The aerial robot, perhaps acting as an observation device, can comprise at least one of: a camera, a sensor, a speaker, a sniffer, and a microphone. The aerial robot can also comprise a delivery device which may, for example, include an arm, box, telephone, or holder. In certain cases, the aerial robot can comprise dimensions no greater than four inches by four inches by seven inches In one embodiment, the aerial robot includes an active noise reduction system. This example active noise reduction system may comprise at least two microphones, a digital signal processing microprocessor, and a speaker. The aerial robot may also include other components. For example, it may comprise a control system for providing hover stability, the control system comprising a microprocessor, a micro-machined gyroscope, and a micro-machined accelerometer. In another example, the aerial robot includes a flight control system, the flight control system comprising an optical digital signal processor circuit capable of maintaining aerial robot position while optically referenced to a ground object. The aerial robot can also comprise a self contained power source and wireless control sensors for remote guided flight when untethered.

In various situations, the flying (or aerial) robot may comprises a body, an internal duct through the body, at least one pair of counter-rotating propellers disposed in the internal duct, first and second remotely operated control fins, and a gyroscope. The dimensions of the flying robot may vary, such as not exceeding approximately six inches by six inches by eight inches, not exceeding a cylinder having a diameter of five inches and a height of seven inches, or not exceeding a cylinder having a diameter of four inches and a height of six inches. The flying robot may also comprise a radio broadcast antenna. In one embodiment, the apparatus further comprises a tether connected to the flying robot, the tether comprising a power transmission line and a bi-directional communication line. The tether may be several thousand feet long or longer. In one embodiment, the flying robot comprises a device delivery holder. The tether is often at least partially wound on the spool, where the tether is a power transmission and (perhaps) a bi-directional communication line. In one embodiment, the flying robot comprises an on-board camera remotely movable to multiple positions with respect to the flying robot.

One embodiment provides an apparatus, the apparatus comprising an aerial robot, a remote communication center, and a secure communication link connected between the aerial robot and the remote communication center. The aerial robot comprises a body, at least one pair of counter-rotating propellers mounted to the body, and an observation device mounted to the body. This secure communication link may be a controlled impedance wire of 30-40 gage (or any other suitable diameter), a fiber optic cable, and so forth. In one embodiment, the aerial robot comprises a powered rotating spool and at least one thousand feet of wire wound on the spool. In some cases, the aerial robot comprises an internal duct inside the body, the internal duct comprising an inlet and an outlet, wherein the at least one pair of counter-rotating propellers are disposed in the internal duct, and first and second orthogonal, movable airfoils at an outlet of the internal duct to control movement of the aerial robot. In one aspect, there is a method comprising counter rotating a pair of aerial robot propellers, navigating the aerial robot through a confined space, powering the aerial robot with a tether, and securely communicating bi-directionally with the aerial robot.

This disclosure further involves aerial robots that dispenses conductive filament or systems, methods, and software for supporting such aerial robots. One remotely powered aerial robot system includes an aerial robot and a power source. The aerial robot comprises a body, a first propeller coupled to the body and operable to provide thrust to the aerial robot, a spool coupled to the body, and a conductive filament that is dispensed from the spool, perhaps by rotation of the spool is one direction. The power source is coupled with, and remote from, the aerial robot via the conductive filament, where the conductive filament is operable to power the first propeller using power from the power source. Specifically, some of the principles described herein relate to aerial robots, some embodiments of which may be suited for remote observation, environment detection, device delivery, communication, and other applications.

Moreover, some or all of these aspects may be further included in respective systems or other devices that may execute or implement suitable software. The details of these and other aspects and embodiments of the disclosure are set forth in the accompanying drawings and the description below. Other features, objects, and advantages of the various embodiments will be apparent from the description and drawings, as well as from the claims.

DESCRIPTION OF DRAWINGS

FIG. 9A is a schematic representation of high voltage command and control circuits on either side of a high voltage DC tether according to one embodiment;

FIG. 9B is a schematic representation of high voltage command and control circuits on either side of a high voltage AC tether according to one embodiment;

DETAILED DESCRIPTION

Illustrative embodiments and aspects of an aerial robot 1 are described below. At a high level, the aerial robot 1 is connected to the ground-based energy source by a lightweight high voltage conductive filament 110. Such a configuration may provide the aerial robot 1 with indefinite time aloft, no or reduced refueling needs, small physical size, quiet operation, and the ability to maneuver and hover for longer periods of time. These robots 1 can then perform a variety of missions, such as long-term unattended surveillance and observation of people and events, inspection missions, search and rescue missions, delivery of emergency supplies and medicines, providing communications, and so forth. As used throughout the specification and claims, the terms "foil" or "airfoil" mean a part or surface, such as a wing, propeller blade, or rudder, whose shape and orientation control stability, direction, lift, thrust, or propulsion. A "propeller" is a machine (or component of a machine) for propelling an aircraft or boat, comprising a power-driven shaft with radiating blades that are placed so as to thrust air or water in a desired direction when spinning. The words "including" and "having," as used in the specification and the claims, have the same meaning as the word "comprising."

Figure 1:
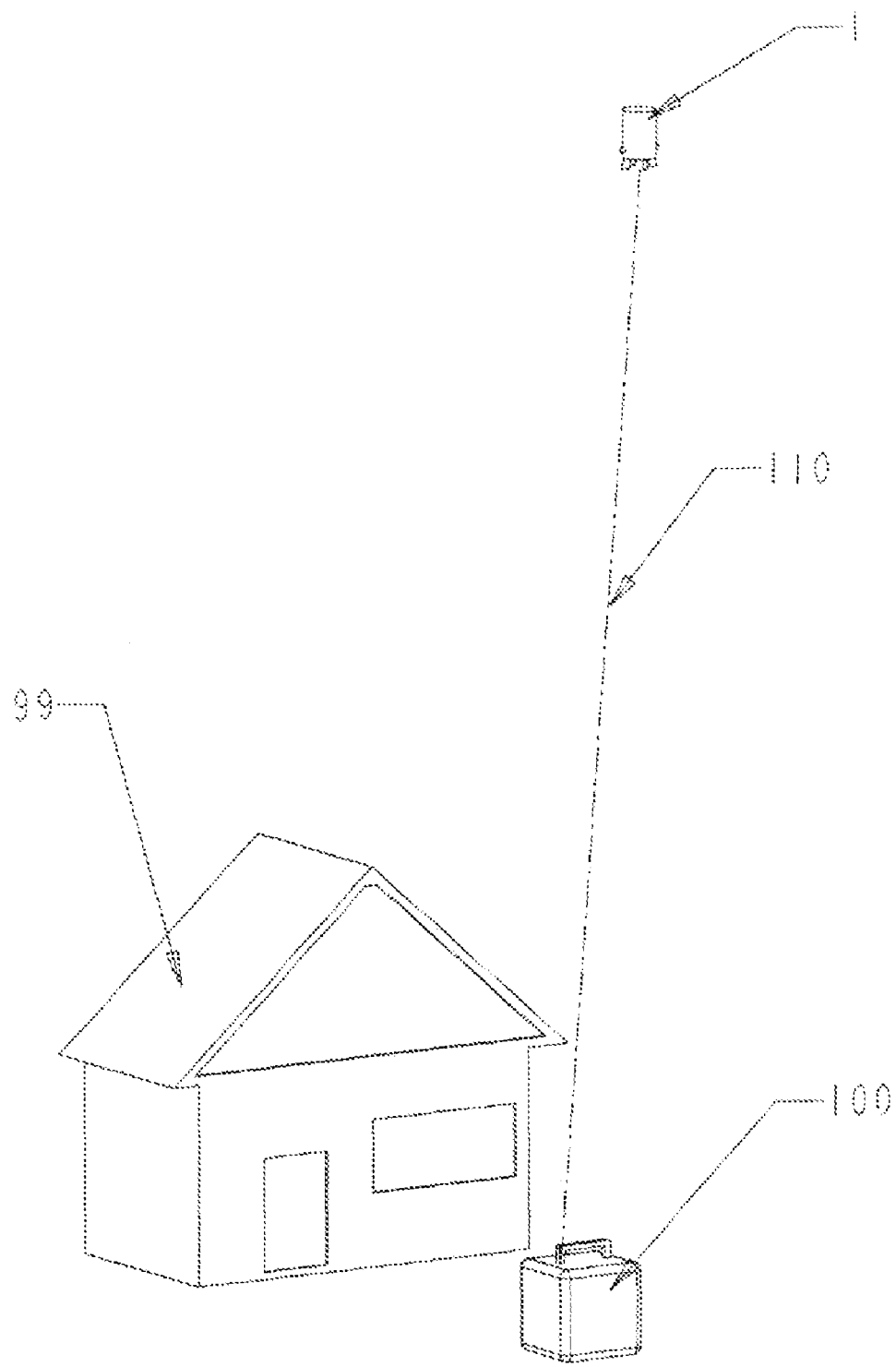
FIG. 1 is a perspective view of an aerial robot in relation to a surface structure according to the one embodiment of the present disclosure.

Turning now to the figures, and in particular to FIG. 1, one embodiment of an aerial robot 1 and the rest of the aerial robot system is shown. According to the embodiment of FIG. 1, the aerial robot comprises an aerial robotic lifting and observational platform 1. In other words, the aerial robot 1 may perform or serve any suitable function, and the description of the aerial robot in terms on these functions, such as aerial robotic lifting and observational platform, is for example purposes only. The aerial robotic lifting and observational platform 1 is shown in relation to a power supply or communication center, such as a powered ground station 100. It will be understood that while described as having a particular number of propellers, the aerial robot may include any suitable number. In other words, description of the aerial robot with respect to one propeller in not meant to limit the aerial to such a number. Moreover, it will be understood that when a single propeller is utilized, the aerial robot may include a separate aerodynamic control surface to help create yaw control.

Figure 2:
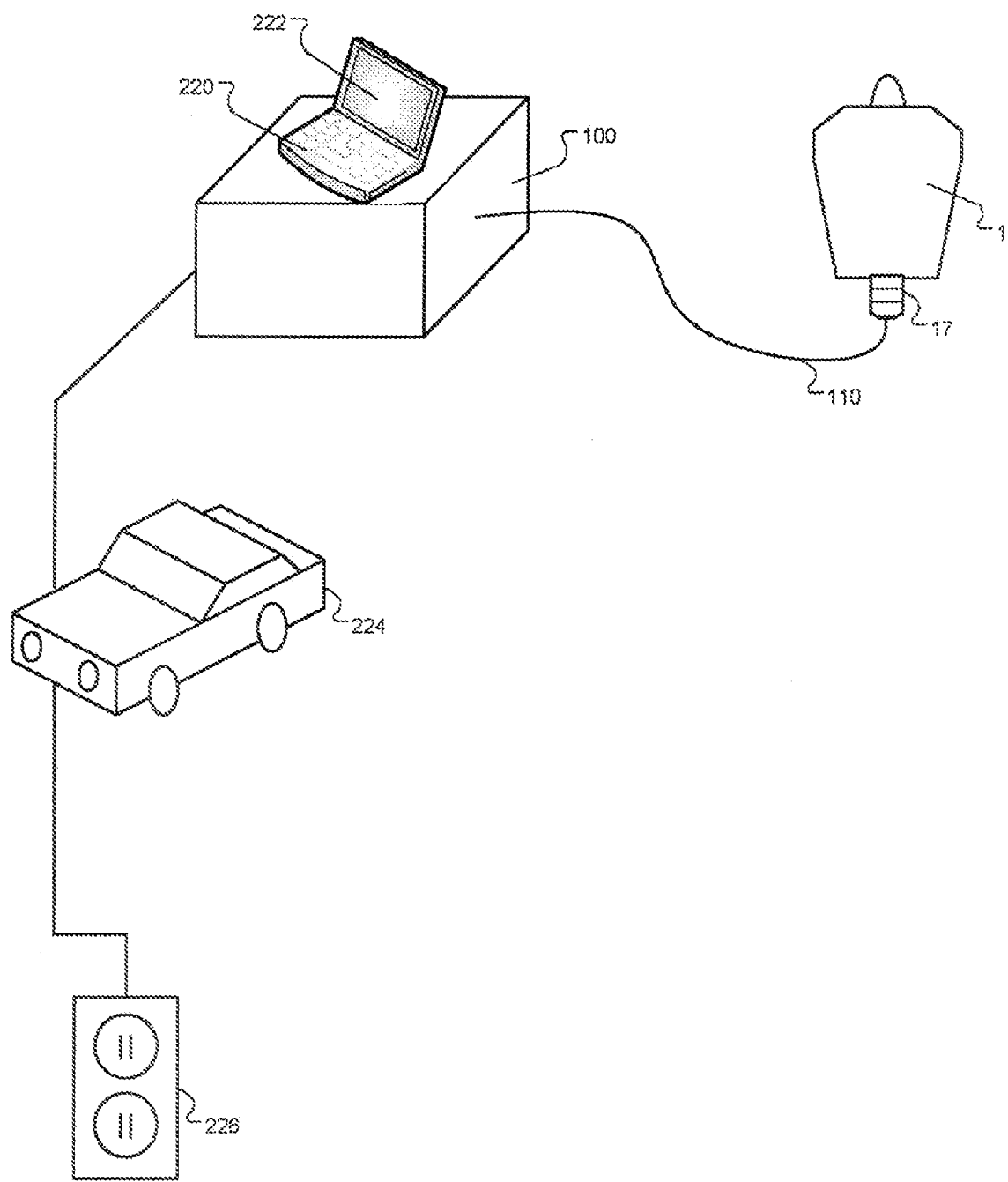
FIG. 2 is an illustration of a remotely powered aerial robot system including an aerial robot with dispensable conductive filament according to the one embodiment of the present disclosure.

Generally, the powered ground station 100 provides electrical power to the aerial robotic lifting and observational platform 1 via a transmission line, such as tether 110. In some cases, the tether 110 also provides single or bi-directional data communication between the aerial robotic lifting and observational platform 1 and the powered ground station 100. FIG. 1 also illustrates a ground structure 99, which the aerial robotic lifting and observational platform 1 is hovering above and may be observing. The tether 110 can further comprise an optical fiber data transmission link that may facilitate the data communications. In another embodiment, an optical fiber is coaxially placed with any power transmission lines of the tether 110, and may be coiled onto the spool 17 (FIG. 2, described in more detail below). The optical fiber link or another communication link, in combination with a control system such as the one described below, may facilitate maintaining the position of the aerial robotic lifting and observational platform 1 while optically referenced to a ground object. In some configurations, the tether 110 may include a flexible support member to help make the tether stronger without substantially comprising the flexibility or weight.

At a high level, the powered ground station 100 comprises one or more large batteries or a generator. While described as a "ground station," it should be understood that the power source may be any remote power source including another aerial device (even another aerial robot 1), marine craft, and so forth. In one embodiment, the powered ground station 100 comprises or is connected to an external power source, such as the electrical grid system that is ubiquitous in modern life. In embodiments wherein the powered ground station 100 comprises or is connected to the electrical grid, flight time for the aerial robotic lifting and observational platform 1 becomes unlimited. In addition to providing power to and data transfer with the aerial robotic lifting and observational platform 1, the powered ground station also includes remote controls for operating the aerial robotic lifting and observational platform 1. Therefore, the aerial robotic lifting and observational platform 1 is operated by remote control and is maneuverable through confined spaces including movement through doors, windows, ducts, hallways, caves, cracks, manways, and other passageways in the ground structure or any other structure. In one embodiment, the ability to maneuver for long periods or even indefinitely through confined spaces is enabled in part by unspooling the tether 110 from a spool 17 carried by the aerial robotic lifting and observational platform 1. According to one embodiment, the spool 17 is powered and can therefore both take up and unwind the tether 110 as the aerial robotic lifting and observational platform 1 moves. In another embodiment, the spool 17 is free floating.

For example, FIG. 2 is an illustration of a remotely powered aerial robot system including an aerial robot 1 with dispensable conductive filament 110 according to the one embodiment of the present disclosure. In this example, by fitting to the aerial robot a spool 17 of small diameter lightweight wire 110, which can be easily dispensed, the robot 1 is free to translate and move about in 3-dimensional airspace. Moreover, since the spool 17 may only dispense the amount of filament 110 appropriate to achieve the desired aerial movement, the robot 1 is not dragging the deployed weight of the filament 110. Additionally, the presence of a small diameter conductive filament wire 110 can allow the transmission of bi-directional data in addition to the aerial robot power. The ability to conduct low voltage radio-frequency carriers at one or many separate frequencies over the same filament as the aerial robot power allows said data to be secure from being received, intercepted, or jammed by others. Therefore, data security is one probable advantage of the disclosed components and techniques. In some cases, the aerial robot 1 might include high energy density batteries, such as lithium poly, as a supplemental power source, such as to allow for operation even when the filament 110 becomes detached, or when power from the ground power source 100 is reduced for any reason.

In one embodiment, the filament 110 comprises a pair of small diameter conductor wires, typically comprising a wire diameter of between 30 gage (0.010 in) to 40 gage (0.003 in). This pair of wires may be coated with a thin jacket of flexible dielectric material, such as molded Teflon, polyethylene, Tefzel, etc. Such dielectrics have relatively high dielectric breakdown strength, on the order of 60 volts per micron. Therefore, a 0.001-inch (1-mil or 25.4 micron) coating on each wire would provide over 3000 volts of dielectric isolation, since there are two wires in proximity. By spacing the distance of this wire pair to be held at a specific conductor center-to-center distance, it is possible to also control the impedance of the wire pair. A preferred embodiment has such spacing molded into the wire pair to provide 50-100 ohms characteristic impedance. Controlled impedance lines exhibit the properties of low transmission losses; very wideband of frequencies efficiently transmitted, very low emitted radio frequency and electromagnetic interference (RFI and EMI), and exhibit a very high common mode rejection ratio (CMMR) against outside interference. Much of these properties of controlled impedance transmission lines are attributed to the lumped parameter inductive-capacitive nature of two parallel spaced conductors. Since the conductors are parallel and the currents are balanced, any EMI or RFI generated by one conductor is nullified by the equal and opposite current in the adjacent conductor. Since many frequencies can be efficiently and simultaneously carried, much data can be transmitted and received with this method. And, finally, unlike a single current carrying wire which, when coiled (onto a spool), will behave as an inductive element, a balanced transmission line, when likewise coiled, exhibits almost no inductive effects. Therefore, as the controlled impedance filament deploys and unspools, very little change to the circuit impedances is created. This can help make the design of corresponding communication hardware and power transmission hardware, such as impedance changing power and data transformers and networks at the ground station 110 and at the aerial robot 1, more straightforward. Other controlled impedance filament configurations are possible, including the well-known coaxial cable construction, rectangular foil ribbon conductors, insulated and twisted conductor pairs, etc.

In some embodiments, the spool 17 contains between 1000 feet to 5280 feet of deployable filament 110. The weight of this quantity of wire 110 at 36 gage would be between 80 grams and 400 grams, which could be easily lifted by most aerial robots 1. Also, the spool 17 could be provided with a quick disconnect housing, so as to easily remove an old empty or used spool, and re-fit a new full spool. Molded into the construction of this spool 17 can be integrated electrical connectors. For example, the micro-coaxial high frequency cable of nominal outside diameter of 0.010 inches may carry over 1000 watts of thru power, at a voltage of 5,000 volts. In one embodiment, over a 1000 foot interval, the twisted wire pairs or micro-coaxial cables carry a current of only 200 milliamperes and dissipate less than 24 watts.

Figure 8:
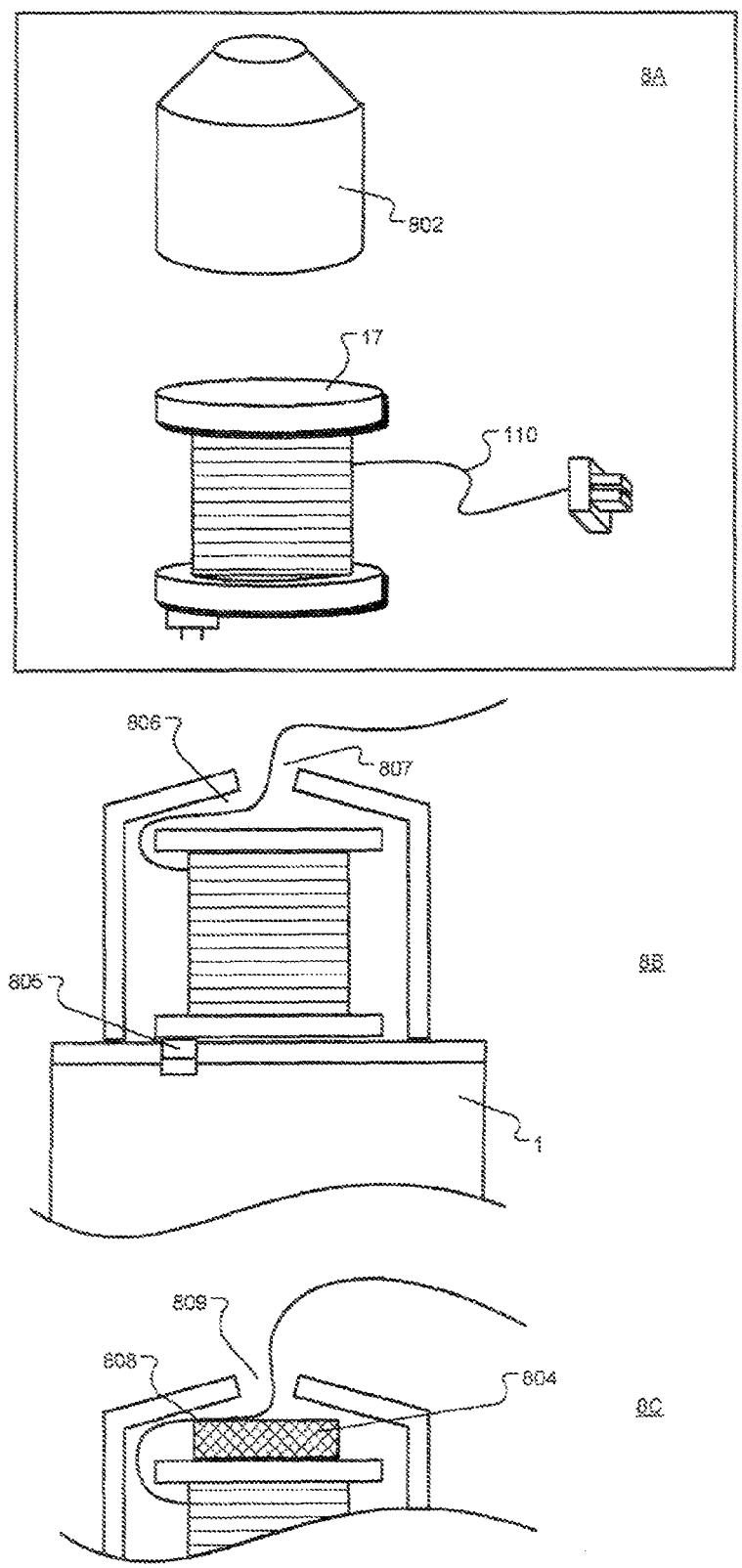
FIG. 8 illustrates an example configuration of the aerial robot with the spool located at the relative top.

Control of the filament 110 tension can be achieved in a number of ways, including conductor wire stiffness, molded insulator stiffness, tacky adhesive coatings on the filament, and mechanical tensioning devices which lightly contact the filament as it deploys. Indeed, the temporary round plug could be molded or fabricated with a slight taper, so as to firmly retain the filament 110 as wound, but when slightly retracted so as to form an annular opening which would provide a constant or variable tension to the filament 110 as it deploys. Such a feature could be under control by either the flight computer of the aerial robot 1 or the remote ground station controller 110. Moreover, the spool 17 may use foam to control to such tension (as shown as 804 in FIG. 8).

Figure 5A:
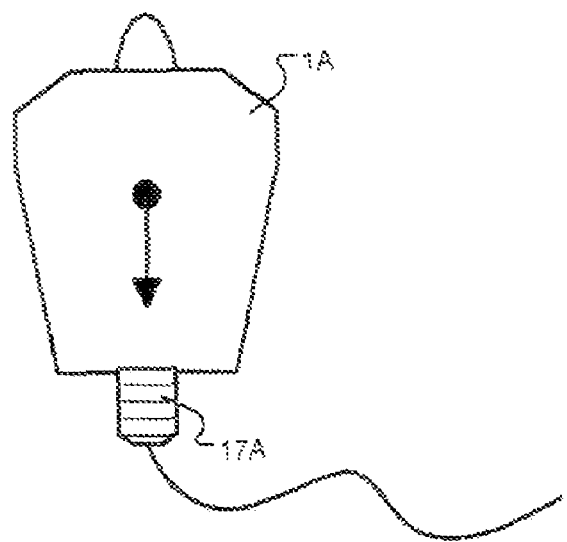
FIGS. 5A-5C provide high-level illustrations of the aerial robot with a spool for dispensing filament in various locations on the aerial robot.
Figure 5B:
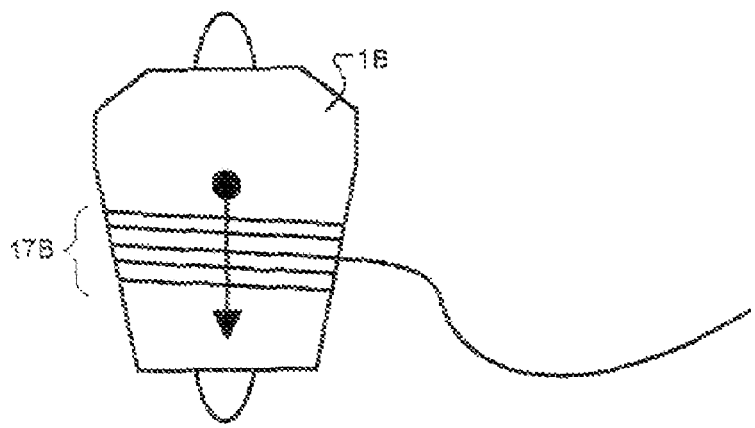
Figure 5C:
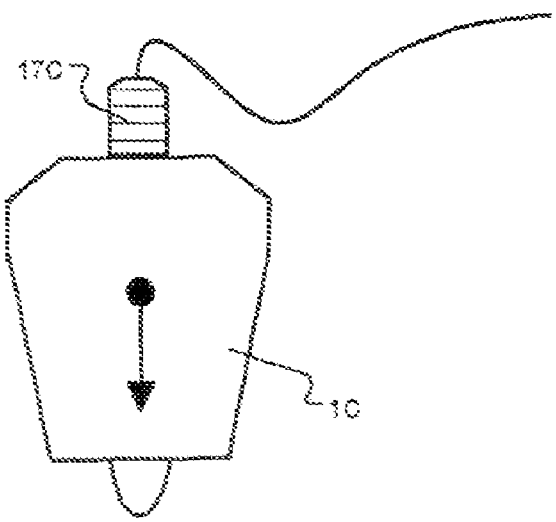

As illustrated in FIGS. 5A-C, the location of the (often rotatable) spool 17 for the controlled impedance conductive filament 110 can be located at many places on the aerial robot 1. Specifically, FIG. 5A illustrates the spool 17A on the relative "bottom" (or aft, tail, etc.) of the aerial robot 1A, FIG. 5B illustrates the spool 17B laterally placed inside the aerial robot 1B and operable to rotate, and FIG. 5C illustrates the spool 17C on the relative "top" of the aerial robot 1C. Moreover, the spool 17 can be smaller or larger in diameter than the outside dimensions of the aerial robot 1. It can have its axis of symmetry aligned with the axis of symmetry of the aerial robot 1, or said axes can be canted with respect to each other, or can be at 90 degrees to each other. The spool 17 can be placed so as to co-locate its center of gravity with the center of gravity of the aerial robot 1, or the two centers of gravities can be displaced. Indeed, other configurations of the spool 17 include orientations whereby the spool 17 could be fitted to conductive slip ring bearings, and thus rotate independently of the aerial robot during deployment.

Figure 3:
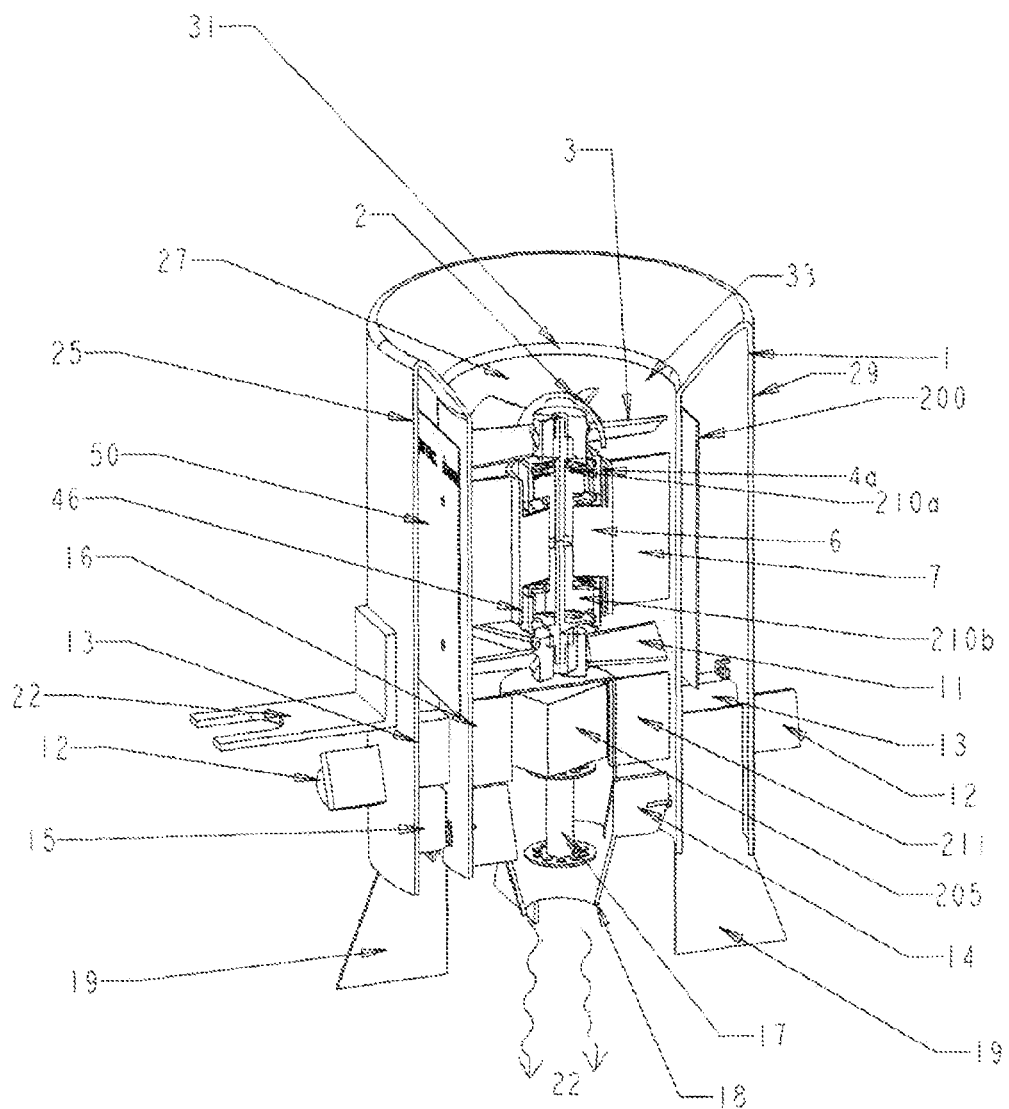
FIG. 3 is a cut-away perspective view of one embodiment of an aerial robot illustrating many of the internal components.
Figure 6:
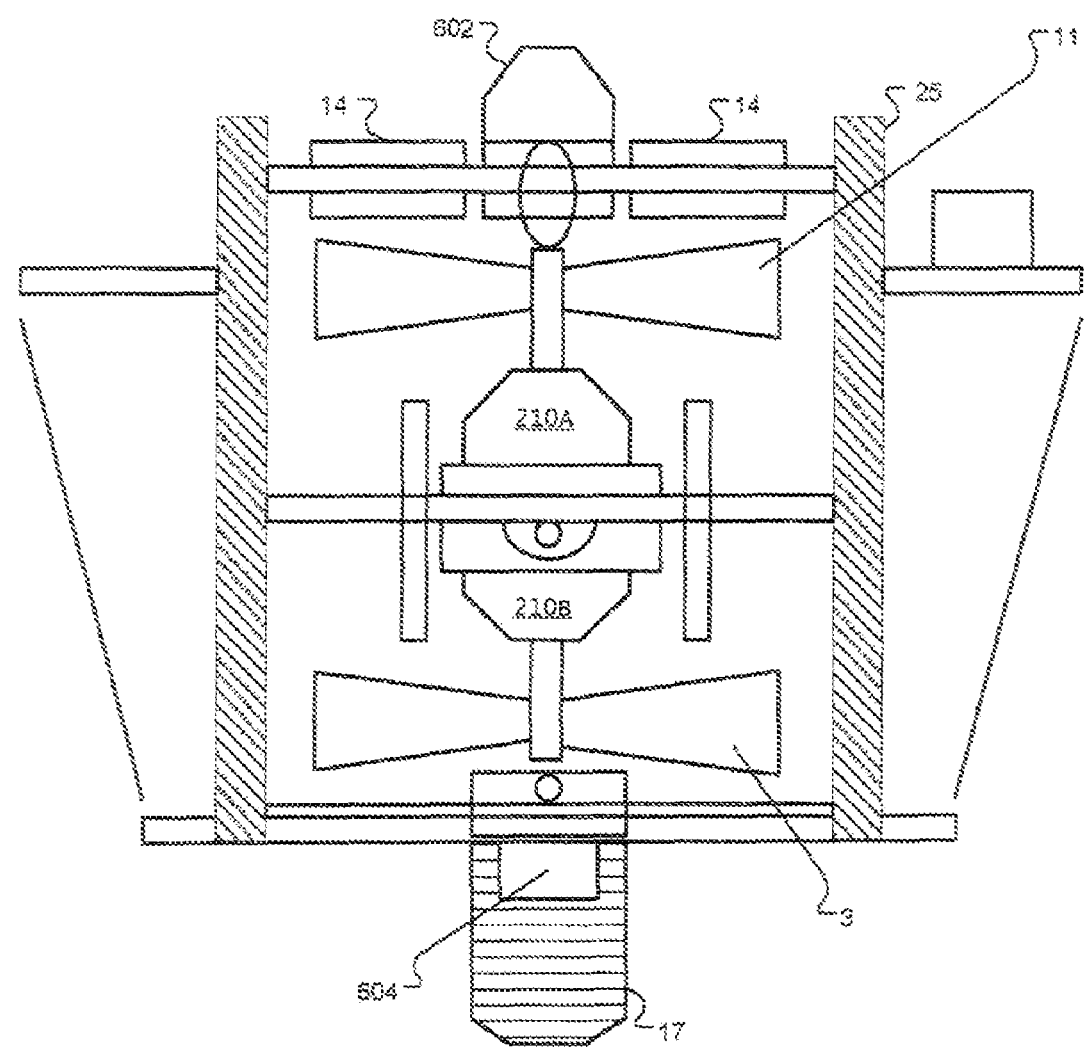
FIG. 6 illustrates a more detailed configuration of the aerial robot with the spool located at the relative bottom.

Turning to FIG. 6, the example spool 17 location is axially symmetric with the aerial robot axis of symmetry and below the propeller or propeller planes(s) 3 and 11. Since it is located centrally in the exit velocity streamline of the high velocity air exhaust, it can also be a formed in part of the inner lower exhaust cone 18 (as shown in FIG. 3). The presence of this small diameter cone 18 may greatly increase the aerodynamic thrust efficiency. The spool 17 is contained within the exhaust cone 18 and is wound and constructed so that the filament deploys and exits from a central annulus formed by the cone. In some cases, the aerial robot 1 may locate the control surfaces 14 on the inlet side of the propeller blades 11, so as to help ensure they are developing control lift when actuated in clean laminar flow air streamlines. Another advantage of locating the spool within the high velocity exhaust streamlines of the aerial robot is the filament deployment assist caused by aerodynamic drag of the high velocity exhaust impingent on the trailing filament wire. Thus, an easily controlled method of positively deploying the filament is made possible, which further minimizes the filament drag created when the aerial robot translates to a new position. In one embodiment, the spool 17 is forced-air cooled by the airstream 22. Therefore, the tether 110 remains cool even when fully wound on the spool 17. As a portion or all of the tether 110 is unspooled, the unspooled portion is cooled by ambient air and also remains relatively cool.

The aerial robot 1 may include the ability to power the motors 210 at a high voltage, thereby reducing or eliminating an on-board step-down transformer. One example is to design the motors 210 with substantially more windings to operate at higher voltages and to design the motor controllers with efficient high voltage switches (FETS) 604 to directly synthesize the motor high voltage waveforms directly from a source of high voltage DC supplied up the conductive filament 110.

Figure 7:
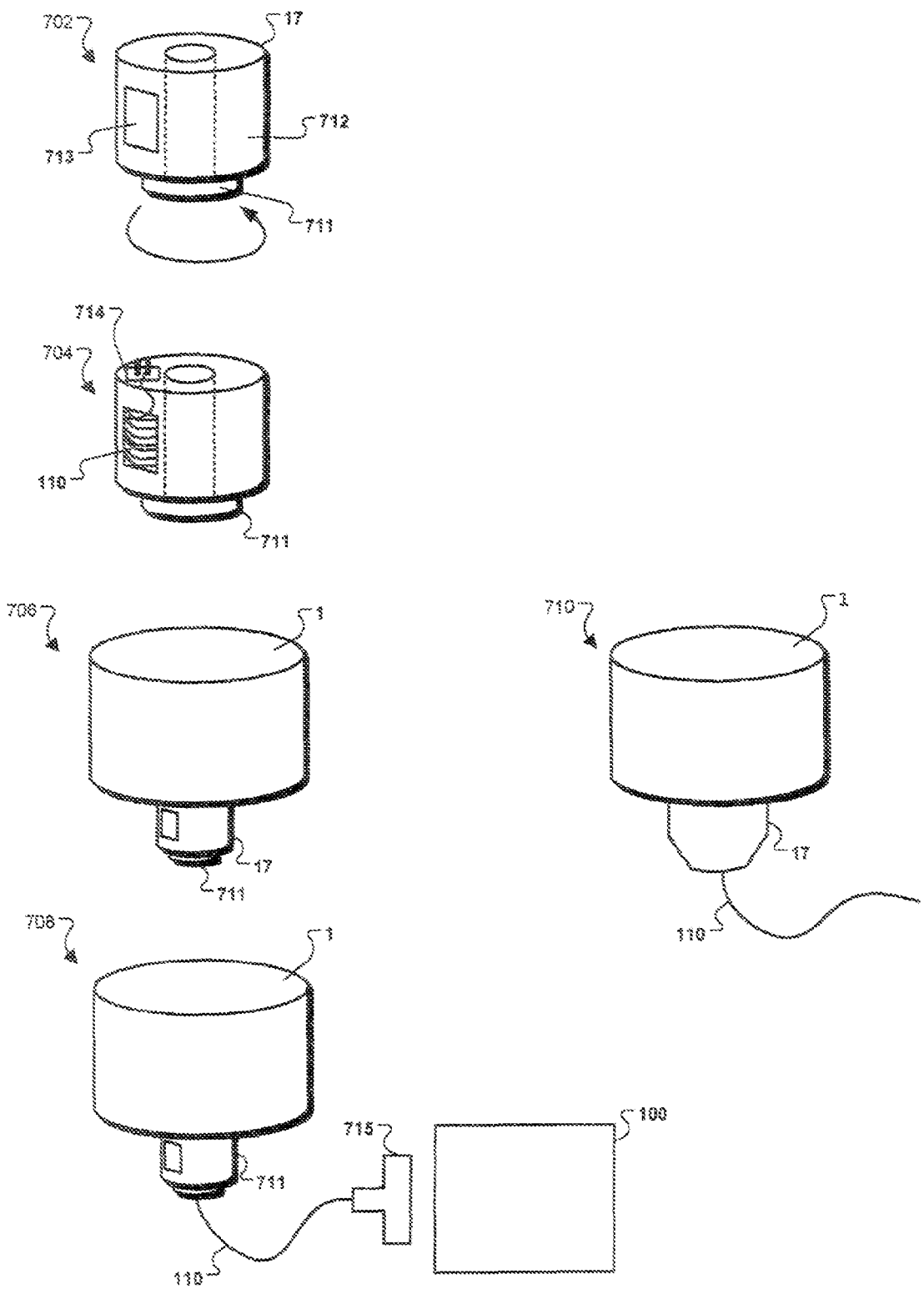
FIG. 7 illustrates an example technique for configuring the spool at the bottom of the aerial robot in FIG. 6.

As shown in FIG. 7, the spool 17 containing an ID feed coil can be easily constructed by first winding the filament 110 over a temporary round plug 711, and (perhaps) providing non-conductive washers to bind the coil sidewalls as it is being built up in many layers, as shown at step 702. The temporary round plug 711 can be either left in place until flight or removed as desired. Rotating the temporary round plug 711 can facilitate winding the filament around the plug. The filament can be fed through the outer cover 712 via the opening 713. Next, at step 704, the filament 110 is attached to a quick disconnect connector 714. The spool 17 is then attached to the robot 1 at step 706. At step 708, the temporary round plug 711 is removed (if it is still present) and the filament 110 is attached to any appropriate outlet, port, etc., on the ground power station 100 via a connector 715. In one embodiment, the temporary round plug 711 and the connector 715 comprise a unitized component. At step 710, the advantage of this ID coil feed approach is the ease with which the filament 110 can be gravity-deployed. As the aerial robot 1 translates in the air, the filament 110 is deployed out the center of the spool 17.

As in FIG. 8A, the spool 17 can be a typical externally wound spool of filament 110 with a separate cover 802. As in FIG. 8B, the spool 17 and cover 802 (or a second spool 17) may be placed at the relative "top" of the aerial robot 1. In this case, a cover 802 and spool 17 are coupled to the body of the robot 1 and electrically connected via a blind mate connector pair 805. In FIG. 8B, wire leaving the spool 17 passes through the gap 806 with relatively no friction and exits opening 807. As shown in FIG. 8C, aerial robot 1 may include a drag or other tension control component (shown here as 804), that adds friction or drag to the wire as it passes through the gap 808 and exits the cover opening 809. The drag can be adjusted by changing the pressure that the drag component 805 places on the inside of the cover 802. In one embodiment, the drag or tension component 804 is compressible foam. In both FIGS. 8B and 8C, the filament 110 would thus exit from the top of the cover 802 to the power source 100, which may form a cone to be more aerodynamic.

Returning to FIG. 2, in some cases, the ground station 100 may include a second or additional tether 110, perhaps using a second spool 17, which can facilitate rapid retraction of the aerial robotic lifting and observational platform 1. Rapid retraction may be utilized in the event of adverse weather, sudden altitude change, or other circumstances. The ground station 100 may be able to convert high voltage from a substantially lower source voltage. Such sources of supply voltage can include internal batteries contained within the ground station, external batteries located remotely from the ground station (an automobile 224, or the like), and AC main power from a local utility feed 226. The ground station 100 typically provides auxiliary data inputs with joystick control, mouse control, keyboard control, and so forth. Likewise, the ground station 100 could provide multiple auxiliary data outputs of video feed lines from video sensors located onboard the aerial robot to one or more clients 220.

Client 220 is any computing device operable to connect or communicate with server 102 or network 108 using any communication link. For example, client 220 is intended to encompass a personal computer, touch screen terminal, workstation, network computer, kiosk, wireless data port, smart phone, personal data assistant ("PDA"), one or more processors within these or other devices, or any other suitable processing device. At a high level, each client 220 includes or executes at least GUI 222 and comprises an electronic computing device operable to receive, transmit, process, and store any appropriate data associated with system 100. It will be understood that there may be any number of clients 220 communicably coupled to server 102. Further, "client 220," "operator," "controller" and "user" may be used interchangeably as appropriate without departing from the scope of this disclosure. Moreover, for ease of illustration, each client 220 is described in terms of being used by one user. But this disclosure contemplates that many users may use one computer or that one user may use multiple computers. For example, client 220 may be a PDA operable to wirelessly connect with an external or unsecured network. In another example, client 220 may comprise a laptop that includes an input device, such as a joystick, keypad, touch screen, mouse, or other device that can accept information, and an output device that conveys information associated with the operation of aerial robot 1, including digital data, visual information, and so forth, via GUI 222. Both the input device and output device may include fixed or removable storage media, such as a magnetic computer disk, CD-ROM, USB drive, or other suitable media, to both receive input from and provide output to users of clients 220 through the display, namely the client portion of GUI 222.

GUI 222 comprises a graphical user interface operable to allow the user of client 220 to interface with at least a portion of information from or about aerial robot 1, such as on-board sensor data (including remaining power, altitude, and position for example), as well as photographs, video, and other multimedia. Generally, GUI 222 provides the particular user with an efficient and user-friendly presentation of data provided by or communicated within the system. For example, GUI 222 may present the user with the components and information that is relevant to their task, increase reuse of such components, and facilitate a sizable developer community around those components. GUI 222 may comprise a plurality of customizable frames or views having interactive fields, pull-down lists, and buttons operated by the user. For example, GUI 222 is operable to display certain data services in a user-friendly form based on the user context and the displayed data. In another example, GUI 222 is operable to display different levels and types of information involving data services based on the identified or supplied user role. GUI 222 may also present a plurality of portals or dashboards. For example, GUI 222 may display a portal that allows users to view, create, and manage historical and real-time reports. Of course, such reports may be in any appropriate output format including PDF, HTML, and printable text. Real-time dashboards often provide table and graph information on the current state of the data, which may be supplemented by data services. It should be understood that the term graphical user interface may be used in the singular or in the plural to describe one or more graphical user interfaces and each of the displays of a particular graphical user interface. Indeed, reference to GUI 222 may indicate a reference to the front-end of another application, as well as the particular interface accessible via client 220, as appropriate, without departing from the scope of this disclosure. Therefore, GUI 222 contemplates any graphical user interface, such as a generic web browser or touchscreen, that processes information in system 100 and efficiently presents the results to the user. In some embodiments, client 220 can access such information via the web browser (e.g., Microsoft Internet Explorer or Mozilla Firefox) and send appropriate HTML, XML, or other data messages to other clients.

In some configurations, the ground station 100 utilizes 12-volt Dc inputs, and 120/220 VAC supplemental power inputs, and provides approximately 600 volts AC at 25-50 kilo-hz for transmission up the filament 110 to power the aerial robot 1. Additionally, it might format serial data between about 10.7 Mhz or 2.4 Ghz in a defined serial data protocol, such as rs232, rs485, USB, etc., for transmission, receipt, and recovery. Since the data is transmitted via the dedicated filament 110, the typical data security issues or problems associated with wireless transmission may not exist. The ground station 100 might also include a quick-disconnect attached to the aerial robot filament conductor, with this quick disconnect making a reliable and safe high voltage connection to the base station high voltage converter and providing sufficient tensioning force not to be easily disconnected. While not illustrated, it will be understood that the ground station 100 could control and power any number of aerial robot units 1 using the same or similar techniques and components. In other words, the ground station 100 may include any number of power sources and/or data ports that correspond to any number of aerial robots 1.

Figure 4:
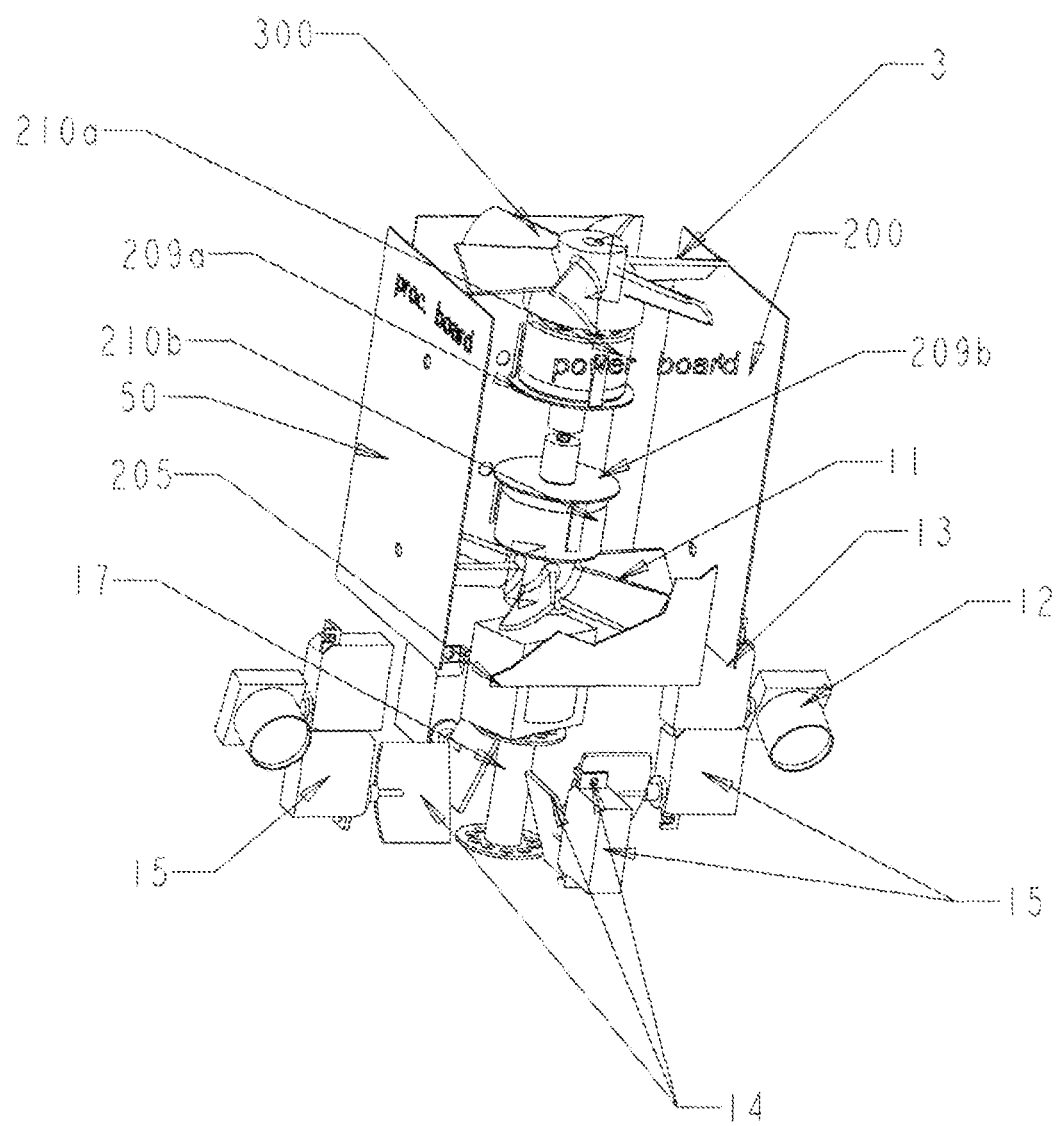
FIG. 4 is an internal perspective view of one embodiment of the aerial robot without a duct to more clearly illustrate certain hidden internal components.

FIGS. 3 and 4 illustrate one embodiment of the aerial robot 1 in cut-away views. FIG. 3 illustrates a body 25 of the example aerial robotic lifting and observational platform 1. In FIG. 4, the body 25 is removed to more clearly show some of the internal components of the example aerial robotic lifting and observational platform 1. In one embodiment, the body 25 comprises a circumferential or cylindrical shroud and defines an internal air passageway, or duct 27. In one embodiment, the body 25 includes an outside surface 29, and inside surface 31, and a hollow annulus 33 between the inside and outside surfaces 29, 31. In one embodiment, the body 25 comprises metal or other structural material. In one embodiment, the orthogonal dimensions of the body 25 do not exceed approximately six inches by six inches by eight inches. These small dimensions allow the aerial robotic lifting and observational platform 1 to maneuver through small, tortuous paths, including building ductwork, and other confined spaces. Small dimensions of the aerial robotic lifting and observational platform 1 also facilitate portability. In one embodiment, the orthogonal dimensions of the body 25 do not exceed approximately four inches by four inches by seven inches. In one embodiment, the orthogonal dimensions of the body 25 do not exceed approximately four inches by four inches by 5.7-6.0 inches. In one embodiment wherein the body 25 comprises a cylindrical shroud, the dimensions of the body 25 do not exceed a cylinder having a diameter of approximately five inches and a height of approximately seven or eight inches. In one embodiment, the dimensions of the body 25 do not exceed a cylinder having a diameter of approximately four inches and a height of approximately six inches.

In one embodiment, a central structural hub 6 is rigidly connected to the body 25. The central structural hub 6 may comprise one or more webbings or vanes 7 connected to the body 25. In one embodiment, first and second electric motors 210a, 210b are mounted to the central structural hub 6.

In one embodiment, the first and second electric motors 210a, 210b are brushless direct current (BLDC) motors, but other motors may also be used. The first and second electrical motors 210a, 210b may be coaxial with one another and coaxial with the body 25. In one embodiment, the first and second electrical motors 210a, 210b are three phase wound stationary rotor type motors. Stationary rotor windings are mounted to the stationary central structural hub 6. In one embodiment, a first rotating permanent magnet bell assembly 4a of the first motor 210a is carried by conventional ball bearings (not shown), and is attached directly to a first fan or propeller 3. Similarly, in one embodiment, a second rotating permanent magnet ball assembly 4b of the second motor 210b is attached directly to a second fan or propeller 11. However, other power transmission arrangements between the first and second motors 210a, 210b and the first and second propellers 3, 11 may also be used. In one configuration, the first propeller 3 rotates in a first direction, for example a clockwise direction. The second propeller 11 rotates in a second direction opposite the first direction, for example, a counterclockwise direction. Therefore, the first and second propellers may comprise a first counter-rotating pair of propellers. Additional propellers may be included in some embodiments.

In order to create a physically small and compact lifting and observational platform 1, ducted propellers 3, 11 may be used. Ducted propellers 3, 11 typically provide higher thrust-to-diameter ratios than open propellers. Nevertheless, in some embodiments where a larger lifting and observational platform can be tolerated, first and second propellers 3 and 11 may be replaced with larger, slower turning propellers of conventional high length-to-chord-width design. Such larger propellers may comprise two or three blades or more. As suggested above, first and second motors 210a, 210b, and, thus, the first and second propellers 3, 11, are counter-rotating with respect to the central structural hub 6. A counter-rotating set of propellers can provide zero net torque acting on the entire assembly, and allow the aerial robotic lifting and observational platform 1 to operate in some embodiments without large, additional, counter-acting thrust control surfaces. Nevertheless, by modulating the power to the first and second motors 210a and 210b with control electronics, small positive or negative net torques may be momentarily created to rotate the entire aerial robotic lifting and observational platform 1. As mentioned above, the vanes 7 may attach the central structural hub 6 to the body 25. In addition, the vanes 7 may straighten the high swirl airflow resulting from the rotating propellers 3, 11.

In some cases, an aft tail-cone assembly 18 is arranged beneath the central structural hub 6 and the associated first and second propellers 3, 11. In one embodiment, the aft tail-cone assembly 18 includes straightening vanes 16. The straightening vanes 16 center and position the tail-cone assembly 18 in the high velocity airstream 22 created by the first and second propellers 3, 11. The aft tail-cone assembly 18 may also include a spool 17 discussed in more detail below.

According to some circumstances, the aerial robotic lifting and observational platform 1 includes a magnetic voltage reducing transformer 205. In one embodiment, the magnetic voltage reducing transformer 205 is located within an outer sheath 211 of the aft tail-cone assembly 18. The magnetic voltage reducing transformer 205 is shown as part of a solid state electronic or high frequency passive transformer system shown in FIGS. 9A and 9B (discussed in more detail below). The magnetic voltage reducing transformer 205 may be placed adjacent to the high velocity airstream 22, as shown in FIG. 3. In compact embodiments of the aerial robotic lifting and observational platform 1, the size of the magnetic voltage reducing transformer 205 can be minimized. Forced air from the high velocity airstream 22 cools the high frequency magnetic voltage reducing transformer 205 material and, thus, allows substantially more power throughput for a given volume of magnetic core and windings.

As mentioned above, some embodiments of the tail-cone assembly 18 comprise the spool 17 for holding, winding, and unwinding the tether 110. In one embodiment, the spool 17 is generally cylindrical. Initially, the spool 17 may have several thousand turns of small diameter twisted wire pair or coaxial cable comprising the tether 110. The spool 17 may hold several thousand feet of tether 110. In one embodiment, the spool 17 holds one to three miles of tether 110 or more. In one embodiment, individual wires of a twisted wire pair each comprise a nominal small 0.005 inch diameter (35 gage). In one embodiment the individual wires are insulated with a thin polymer dielectric insulation coating specified to have a breakdown voltage substantially greater than the voltage the tether 110 is designed to carry. In one embodiment, the weight of this example 35 gage twisted wire pair is approximately 47 grams per thousand feet. The spool 17 may also or alternatively carry a known or controlled impedance micro-coaxial cable. In one embodiment carrying a micro-coaxial cable, a single inner axially aligned conductor is covered with a thin coating of insulative dielectric coating, then subsequently surrounded by an annular outer conductor. In some embodiments, the annual outer conductor comprises a woven pattern, tape, or other metallic covering.

FIGS. 3 and 4 also illustrate pitch and yaw servomotors 15. In one embodiment, there are one or more small servomotors 15 per axis to be controlled. In one embodiment, one servomotor 15 is connected to an associated air foil, aileron, or control fin 14. In one embodiment, the control range of the control fins 14 is approximately +/−15 degrees from the direction of the high velocity airstream 22. According to some embodiments, there may be four orthogonal control fins 14.

In one aspect, the aerial robotic lifting and observational platform 1 is usually operated under a tether condition. Therefore, only small control fin 14 movements may be necessary to hold position on each axis, or to accelerate to a different orientation. However, the control fins 14 facilitate directional control in the event of operation with a detached tether wire (during which time power is provided by an on-board power supply board 200).

Observation devices 12 can be mounted to the aerial robotic lifting and observational platform 1 using various coupling techniques. The observation devices 12 may comprise video or IR cameras, sensors, microphones, speakers, device holders, or other components. For example, the observation devices 12 may comprise a video camera imaging device attached to another set of tilting servomotors 13. Due in part to the ability of the aerial robotic lifting and observational platform 1 to rotate about its horizontal and vertical axes, complete camera coverage for objects to be observed can be accommodated with a tilt function implemented by the servomotors 13. Additional camera degrees of freedom, such as focus, zoom, roll, etc., may also be easily accomplished by providing for additional camera actuators. Another useful imaging accessory comprising the observation device 12 may be a camera providing images in the far infrared, thereby allowing for discrimination of heat sources such as persons, animals, vehicles, etc. The observation devices 12 may comprise sensors for detecting various gases, particulates, fluids, or other matter.

The airstream outlet of the aerial robotic lifting and observational platform 1 may comprise a plurality of support fins 19. For example, as shown in FIGS. 3 and 4, there are four orthogonal support fins 19. These example support fins 19 provide clearance for the tailcone 18 assembly before liftoff, and when the aerial robotic lifting and observational platform 1 lands. The support fins 19 may also provide clearance on a horizontal surface when the aerial robotic lifting and observational platform 1 is operated in a non-flying mode.

Referring next to FIG. 9A, a schematic representation of the electronic power supply system for the aerial robotic lifting and observational platform 1 is shown. As mentioned above, powered ground station 100 may comprise a power supply. FIG. 9A illustrates one implementation of a power supply for the powered ground station 100 that converts a low voltage DC source (e.g. approximately 12 to 48 volts), high current battery 101, or secondary supply 102, into a high voltage, low current source carried by the tether wires 110.

Many transformer designs including (but not limited to) an electronic inverter, a flyback boost, a half bridge, and a full bridge may be used to transform low voltage, high current power to high voltage, low current power, in an efficient manner. In some embodiments, a half bridge or full bridge design is adequate. As shown in FIG. 9A, Mosfet switches 103 and 104 alternately switch on and off, thereby inducing a magnetic transformer primary coil with a square wave voltage of root mean square (RMS) DC magnitude of one-half of the DC voltage supplied by the batteries 101 or the secondary DC source 102. The voltage across a transformer primary coil 105a of transformer 105 is amplified (by a primary-to-secondary turns ratio) to a new higher voltage across secondary windings 105b. In one embodiment, a diode rectifier bridge 107 converts high frequency sinusoidal voltages in the range of 20 kilo-hertz to 5 mega-hertz into a pulsating direct current, and a smoothing capacitor 108 provides a low ripple, nearly constant, high voltage DC that is transmitted by the tether 110. It will be understood by one of ordinary skill in the art having the benefit of this disclosure that protective circuits, voltage, and current regulation circuits, noise reduction circuits, cooling apparatus, etc., may also be added to the circuitry of the DC power supply comprising the powered ground station 100.

Continuing to refer to FIG. 9A, embodiments providing a high voltage direct current for transmission by the tether 110 may be accompanied by the solid state electronic voltage reducing transformer 205 of power supply 200. The power supply 200 is packaged aboard the aerial robotic lifting and observational platform 1 (FIG. 3). Many well-known electronic inverter, flyback boost, half bridge, and full bridge designs may facilitate transformation in an efficient manner. In one embodiment shown in FIG. 9A, a half bridge design is adequate. As shown in FIG. 9A, Mosfet switches 203, 204 alternately switch on and off. Switching the Mosfet switches 203, 204 on and off induces a square wave voltage having a magnitude of one-half of the DC voltage of the tether 110. The voltage across a transformer primary coil 205a is reduced by the transformer 205 primary-to-secondary turns ratio, to a new lower voltage across secondary windings 205b. A diode rectifier bridge 207 converts the 20 kilo-hertz-5 mega-hertz high frequency sinusoidal voltage into a pulsating direct current, while a smoothing capacitor 208 provides for a low ripple, nearly constant, low voltage direct current. The low voltage direct current may be received, for example, by the control electronics shown in FIG. 10, the first and second motors 210a, 210b, the servomotors 13, 15, the observation device 12, and any other powered components.

It will be understood that protective circuits, voltage and current regulation circuits, noise reduction circuits, cooling apparatus, etc., may also be added to the power supply 200 circuitry of FIG. 9A to facilitate reliable operation of such a high voltage-to-lower voltage DC power supply. In one embodiment, the heat producing components, such as the Mosfet switches 203, 204, the transformer 205, and the diode rectifier 207, are arranged in or adjacent to the high speed airstream 22. The arrangement of the heat producing components in or adjacent to the cooling airstream 22 facilitates smaller sizes and weights for these components. In one embodiment, the power supply 200 weighs just 30 grams, including the transformer 205.

In one embodiment, the power supply 200 may also include an energy storage device. For example, the capacitor 208 may comprise an energy storage device. The capacitor or energy storage device 208 may be sized to provide adequate power to the aerial robotic lifting and observational platform 1 for a limited-duration untethered flight. An untethered flight may result from an intentional or unintentional disconnection from the tether 110. The capacitor or energy storage device 208 may include, for example, a super-capacitor, chemical batteries, and a miniature on-board fuel powered DC generator.

FIG. 9B illustrates another embodiment for a power system 100/200. FIG. 9B represents a high frequency alternating current (AC) power system. The tether 110 associated with the AC power system of FIG. 9B may be of known or controlled impedance. Coaxial cables, as well as twisted pair conductors separated by an insulating dielectric, may provide the tether 110 with known or controlled impedance. A controlled-impedance tether 110 allows power from a high frequency power source to be impedance-matched with the tether 110 to optimize the coupling of power. Transforming high voltage radio frequency power at high intrinsic power levels is well known to radio design engineers having the benefit of this disclosure.

In the embodiment of FIG. 9B, the receiving transformer 205 may also be impedance matched to efficiently receive high frequency power from the impedance-controlled tether 110. It will be understood by those of ordinary skill in the art having the benefit of this disclosure that an impedance-controlled cable having only two conductors is inherently self-shielding against the generation or reception of radio frequency nose and interference (RFI). RFI created by current flowing in one direction of a wire is equally and oppositely counteracted (and nullified) by the return current flowing oppositely in the adjacent wire. Impedance-controlled cables are inherently shielded against the creation or reception of unwanted RFI signals, and they provide a secure and RFI-free method of transferring sensitive data and information. This feature may be important for applications in which data sent to and from the aerial robotic lifting and observational platform 1 are to be kept secret or secure from outside persons or agencies.

The powered ground station 100 represented in FIG. 9B is a solid state electronic power supply and is packaged to be carried aboard the aerial robotic lifting and observational platform 1. Again, any suitable transformer design may be used to transform low voltage, high current power to high voltage, low current power in an efficient manner. In one embodiment, a half bridge or radio frequency amplifier design is adequate. As shown in FIG. 9B, Mosfet switch pairs 103, 104 alternately switch on and off, thereby inducing across the tuned magnetic transformer primary coil 105b a high purity single frequency sine wave. The high frequency sine wave is efficiently coupled by impedance matching to the tether 110. Likewise, the magnetic transformer 205 is impedance matched to the tether 110 to efficiently convert the high voltage cross windings 205a to a lower voltage delivered across windings 205b. The diode rectifier bridge 207 converts the 20 kilo-hertz to 2 mega-hertz high frequency sinusoidal voltage into a pulsating direct current, while smoothing capacitor 208 provides for a low ripple, nearly constant low voltage direct current to the control electronics represented in FIG. 10. The low voltage direct current may also be provided to the first and second motors 210a, 210b, the servomotors 13, 15, and any other powered components (such as the observation device 12).

It will be understood that protective circuits, voltage and current regulation circuits, noise reduction circuits, cooling apparatus, etc., may also be added to the power supply 200 circuitry of FIG. 9B to facilitate reliable operation of such a high voltage-to-lower voltage AC-to-DC power supply. In one embodiment, the heat producing components, such as the Mosfet switches 203, 204, the transformer 205, and the diode rectifier 207, are arranged in or adjacent to the high speed airstream 22. The arrangement of the heat-producing components in or adjacent to the cooling airstream 22 facilitates smaller sizes and weights for these components. In one embodiment, the power supply 200 weighs just 30 grams, including the transformer 205.

In one embodiment, the power supply 200 of FIG. 9B may also include an energy storage device. For example, the capacitor 208 may comprise an energy storage device. The capacitor or energy storage device 208 is sized to provide adequate power to the aerial robotic lifting and observational platform 1 for a limited-duration untethered flight. An untethered flight may result from an intentional or unintentional disconnection from the tether 110. The capacitor or energy storage device 208 may include, for examples, a super-capacitor, chemical batteries, and a miniature on-board fuel powered DC generator.

Figure 10:
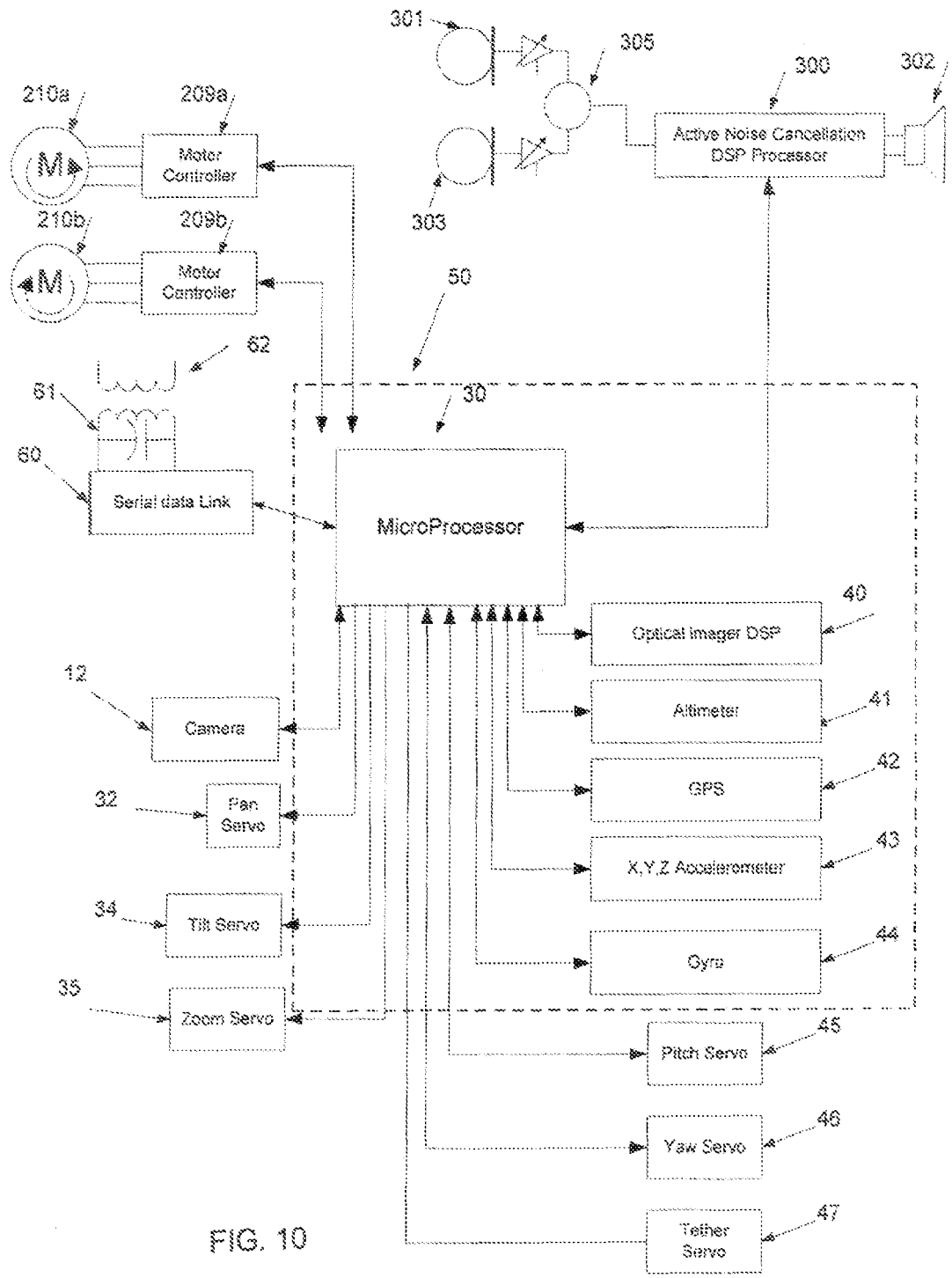
FIG. 10 is a schematic representation of control and sensor circuits of the aerial robot of FIG. 2 according to one embodiment.

FIG. 10 is an electronics and control schematic block diagram of the aerial robotic lifting and observational platform 1, according to one embodiment of the present disclosure. In one embodiment, a microprocessor 30 manages the collection, scheduling, computation, transmission, and receipt of data. A serial link 60, which may comprise a commercially available twisted pair transceiver integrated circuit, is capable of secure transmission and receipt of data placed on the tether 110.

Voltage isolation may be facilitated by a variety of techniques known to those of ordinary skill in the art having the benefit of this disclosure. In one embodiment, tuned magnetically isolated windings 61, 62 reject all noise and frequencies that are not within a desired MBPS (megabits per second) data transmission packet range. In some embodiments, voltage is isolated by capacitive isolation or electro-optical isolation employing optical isolator integrated circuits.

In one embodiment, one or more on-board data sensors may communicate with the microprocessor 30, as shown in FIG. 10. For example, a gyroscope 44 may continuously measure and integrate the angular rotation of the aerial robotic lifting and observational platform 1. The gyroscope 44 may comprise a micro-machined silicon integrated circuit available, for example, from Analog Devices (ADI-16300 300 degrees per second gyroscope). The microprocessor 30 may continuously receive data from the gyroscope 44 and may compute and direct any correction to one or more of the electric motor controllers 209, 209*b*. The microprocessor 30 may also use data from the gyroscope 44 to correct angular drift by activating pitch servos 45, yaw servos 46, or a combination of both. The microprocessor 30 may also control a tether servo 47 to wind and unwind the tether 110 from the spool 17. The microprocessor 30 and other control components may communicate via wireless signals when the tether 110 is disconnected. Accordingly, in one embodiment, the microprocessor and/or other control components or sensors described herein may comprise wireless controls or sensors, or a wireless data receiver or transceiver interface.

In some cases, an accelerometer 43 continuously measures and integrates accelerations in the three orthogonal physical planes of the aerial robotic lifting and observational platform 1. In one embodiment, the accelerometer 43 comprises an integrated circuit available from Analog Devices (ADI-16100 integrated 2 and 3 axis accelerometer).

The aerial robotic lifting and observational platform 1 may also include an altimeter 41. The altimeter 41 allows the microprocessor to precisely hold altitude, or to ascend or descend in a controlled manner. The altimeter 41 may facilitate, for example, traversing a stairwell or transitioning between floors of a building. In one embodiment, the altimeter 41 is commercially available from, for example, VTI technologies (SCP 1000 Digital pressure sensor).

Further, the aerial robotic lifting and observational platform 1 may have a global positioning system (GPS) module 42 that can facilitate continuous monitoring of the position of the aerial robotic lifting and observational platform 1. The microprocessor 30 may act on the positional data provided by the GPS module 42 to allow the aerial robotic lifting and observational platform 1 to traverse particular paths. The GPS module 42 may also report back an actual GPS position of the aerial robotic lifting and observational platform 1 to the powered ground station 100. In one embodiment, the GPS module 42 comprises a NAVSYNC Technologies CW25-NAV miniature GPS receiver.

In one embodiment, an optical imager digital signal processor (DSP) circuit 40 may utilize built-in optical computational features of an optical mouse data pointing chip. Utilizing a suitable lens combination pointing toward the earth's surface, the optical imager DSP circuit 40 can update changes in physical position up to 6000 times per second. For example, the optical imager DSP 40 may be an Agilent ADNS-3080 Optical Mouse Digital Signal Processing engine.

In one embodiment of the aerial robotic lifting and observational platform 1 including an observation device 12, the microprocessor may communicate with the observation device 12 as well as a pan servo 32, a tilt servo 34 operating the servomotors 13, and a zoom servo 35.

In certain configurations, the microprocessor 30, the optical imager DSP 40, the altimeter 41, the GPS module 42, the accelerometer 43, and the gyroscope 44 reside on printed circuit assembly 50. The printed circuit assembly 50 is shown in FIGS. 2 and 3.

The aerial robotic lifting and observational platform 1 may also include an active noise reduction DSP processor 300. Although much research has been conducted in the area of active noise reduction for long, simple ducts (see, for example, Kuo and Morgan, "Active Noise Control Systems," WILEY SERIES IN TELECOMMUNICATIONS AND SIGNAL PROCESSING 1995, ISBN 0-471-13424-4), the control of noise in short ducts, such as the duct 27 of FIG. 2, is not presently well understood or documented. Although some embodiments of the aerial robotic lifting and observational platform 1 have a noise spectra which is in part comprised of periodic and regularly recurring frequencies (derived from the rotational speed of the propellers 3, 11 and the motors 210*a*, 210*b*) and thus can be predicted, there is also uncorrelated noise. Some of the uncorrelated noise may result from the highly turbulent and chaotic airflow separation from structural elements located adjacent to and in the path of the high velocity airstream 22.

Noise resulting from turbulent and chaotic airflow separation or other sources is undesirable in many circumstances. Therefore, some embodiments of the aerial robotic lifting and observational platform 1 may comprise a noise reduction system. Passive absorption and dampening, which can be used in large ducted fan structures, is of limited effect for small and compact ducted fans, such as one embodiment described above. Therefore, one embodiment of the aerial robotic lifting and observational platform 1 illustrated in FIG. 11 includes an active noise reduction system.

Figure 11:
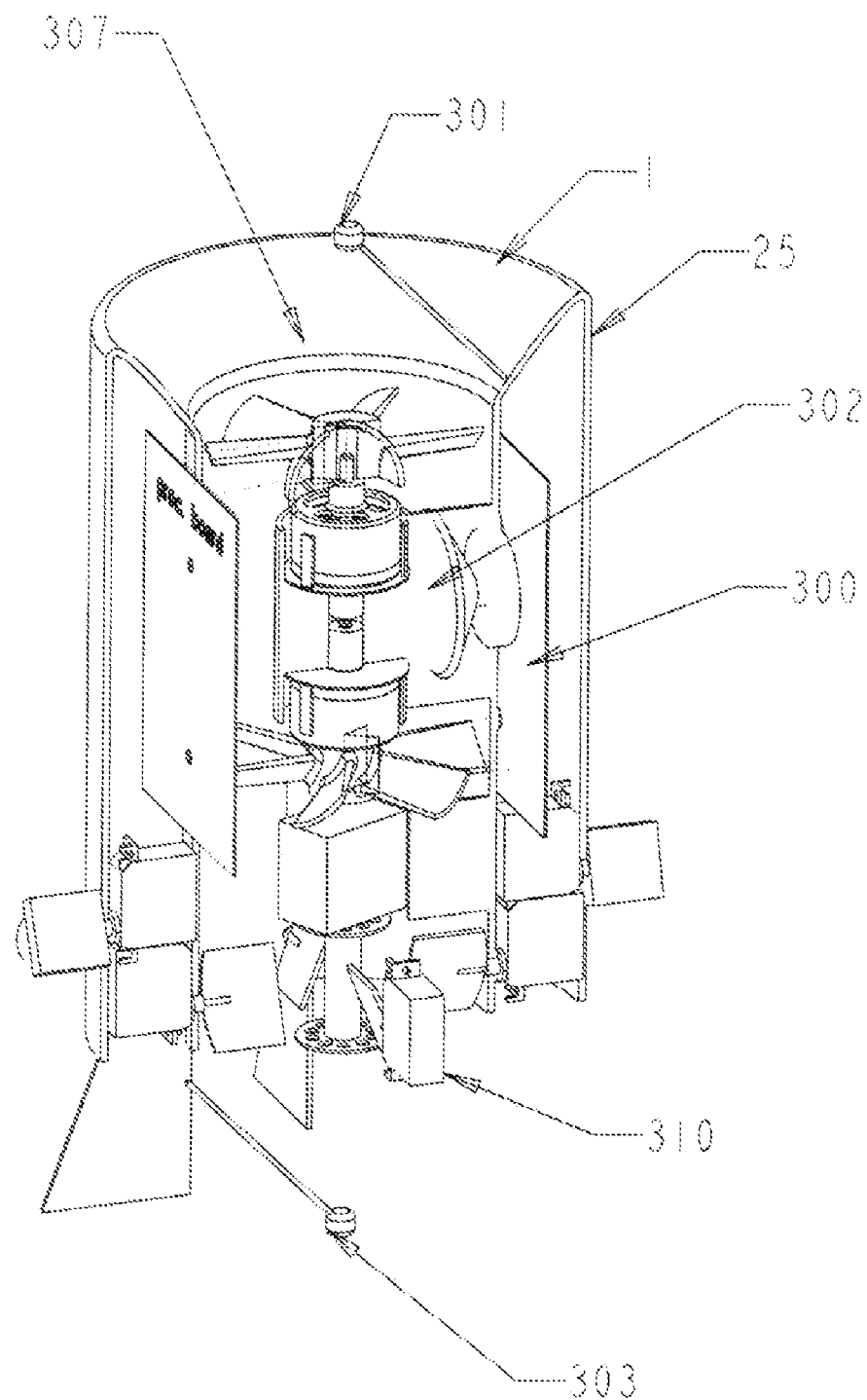
FIG. 11 is a cut-away perspective view of one embodiment of an aerial robot illustrating placement of an active noise reducing system.

The active noise reduction system of FIG. 11 comprises a first error pick-up microphone 301 attached to the housing 25 at an air inlet 305, and a second error pick-up microphone 303 attached to the housing 25 at an airflow outlet 310. The second error pick-up microphone 303 faces away from the airflow. The aerial robotic lifting and observational platform 1 radiates acoustic noise from both the inlet 305 and outlet 310 apertures adjacent to the respective error pick-up microphones 301, 303. The frequency, spectral power content, and phase amplitude of the radiated acoustical sound pressures are surprisingly uniform at each of the first and second error pick-up microphones 301, 303. One reason for the uniformity may be the small dimensions of some embodiments of the present disclosure. The speed of sound at 75 degrees Fahrenheit and sea level conditions is approximately 343 meters per second (or about 13,514 inches per second). At a frequency of 7,000 hertz, the wavelength of acoustic energy is less than two inches. Thus, high frequency sounds generated within the aerial robotic lifting and observational platform 1 can easily propagate to either the inlet 305 or the outlet 310.

Classical active noise reduction systems tend to use an electrical speaker to create acoustic energy that is shifted out of phase 180 degrees from the original noise source requiring mitigation. Both the original acoustic noise and the 180 degree phase-shifted anti-noise propagate through a long duct before encountering a feedback acoustical pick-up microphone. By inputting (via an error pick-up microphone) the resultant noise following the addition of speaker anti-noise to the original source noise and applying a series of mathematical filtering and digital signal processing techniques, a processor computes and adjusts the particular signal to be amplified and fed to the speaker. One computational method of creating such a feedback loop can be found in the article cited above by Kuo and Morgan.

According to one embodiment of the present disclosure, the use of a long duct is not practical. Likewise, the use of separate active noise control systems and anti-noise generating speakers at each of inlet 307 and outlet 310 may not be practical. Two full and separate systems may contaminate and confuse one another. However, one embodiment uses a single active noise reduction system including a DSP circuit 300, a speaker 302, and two error sensing microphones 301 and 303. The active noise reduction system of FIG. 11 substantially reduces the acoustical noise broadcast by the aerial robotic lifting and observational platform 1.

In one embodiment of the active noise reduction system illustrated by FIGS. 10 and 11, a statistical least squares summing technique 305 is applied to the signals from the microphones 301, 303. The resultant sum is input to the DSP algorithms. In one embodiment, a single anti-noise signal is effectively fed to the speaker 302 to dramatically reduce any broadcast noise. Thus, the aerial robot 1 can utilize two or more input error sensing microphones 301, 303 with appropriate mathematical or circuitry-generated statistical signal conditioning to create a single input and single output system. It is anticipated that numerous changes, additions, and substitutions to the above described active noise control system could be made without altering the novelty or inventive nature of the above-described solution. Moreover, some embodiments of the aerial robotic lifting and observational platform 1 may include any other noise reduction system or no noise reduction system at all.

Figure 12:
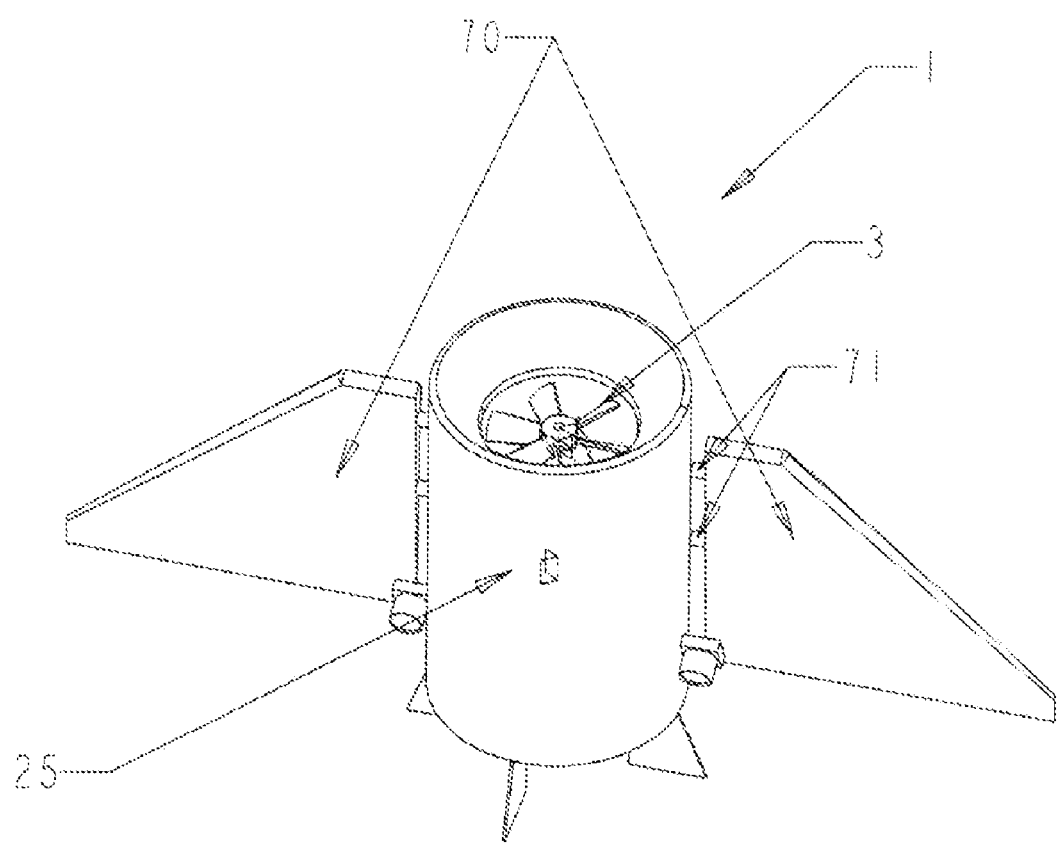
FIG. 12 is a perspective view of one embodiment of an aerial robot including wings.

Referring next to FIG. 12, another embodiment of the aerial robotic lifting and observational platform 1 may include permanent or snap-on detachable wings 70. In the embodiment of FIG. 12, the wings 70 are permanently or temporarily attached to the body 25 by wing attachments 71. The addition of the wings 70 may permit the aerial robotic lifting and observational platform 1 to function more like a traditional unmanned aerial vehicle (UAV) when it is untethered. The wings 70 may facilitate level flight while powered by an on-board power source, such as the capacitor or other energy storage device 208 (FIGS. 9A-9B). Thus, in level flight, the wings 70 provide lift, while the propellers 3, 11 provide thrust to propel the aerial robotic lifting and observational platform 1 in a forward direction. In a level flight mode, great distances can be traversed because far less thrust is used for level flight than for hovering. Once the aerial robotic lifting and observational platform 1 reaches its target destination, it can easily revert to a stationary hover mode. When the aerial robotic lifting and observational platform 1 has completed its mission, it may return home with the remaining energy, or simply fall to earth and be recovered or destroyed.

Another embodiment of the aerial robotic lifting and observational platform 1 may facilitate simplified flight control calculations and implementations. For example, the embodiment of FIG. 13 includes structure that tends to simplify flight control. According to the embodiment of FIG. 13, the inside surface 31 of the duct houses the first and second propellers 3, 11 and the associated drive motors 210*a*, 210*b*. However, the aerial robotic lifting and observational platform 1 includes an elongated empennage tube 72. The elongated empennage tube 72 may have the servomotors 15, control fins 14, transformer 205, and printed circuit assembly 50 mounted or attached thereto. In one embodiment, the control fins 14 and associated servomotor pairs 15 are mounted at right angles to one another, with each pair of control surfaces moving in similar directions simultaneously or nearly simultaneously. Each pair of control fins 14 may define a single flight control surface, if desired. These surfaces of the control fins 14, when actuated, cause a measurable angle of attack with respect to the oncoming high velocity airstream 22 from the first and second propellers 3, 11, and create a restoring moment to keep the aerial robotic lifting and observational platform 1 in a vertical orientation, or any other orientation so directed by the microprocessor 30 control block.

In one embodiment, the spool 17 is connected between the housing 25 and the empennage 72. The spool 17 is positioned at or near the center of gravity of the aerial robotic lifting and observational platform 1. Therefore, tether wire 110, by virtue of its location at or near the center of gravity, becomes the pivoting balance point for the aerial robotic lifting and observational platform 1. Thus, the weight of the tether 110 does not add an appreciable moment to disrupt the airframe controllability because any tether forces act at the airframe center of gravity.

Figure 13:
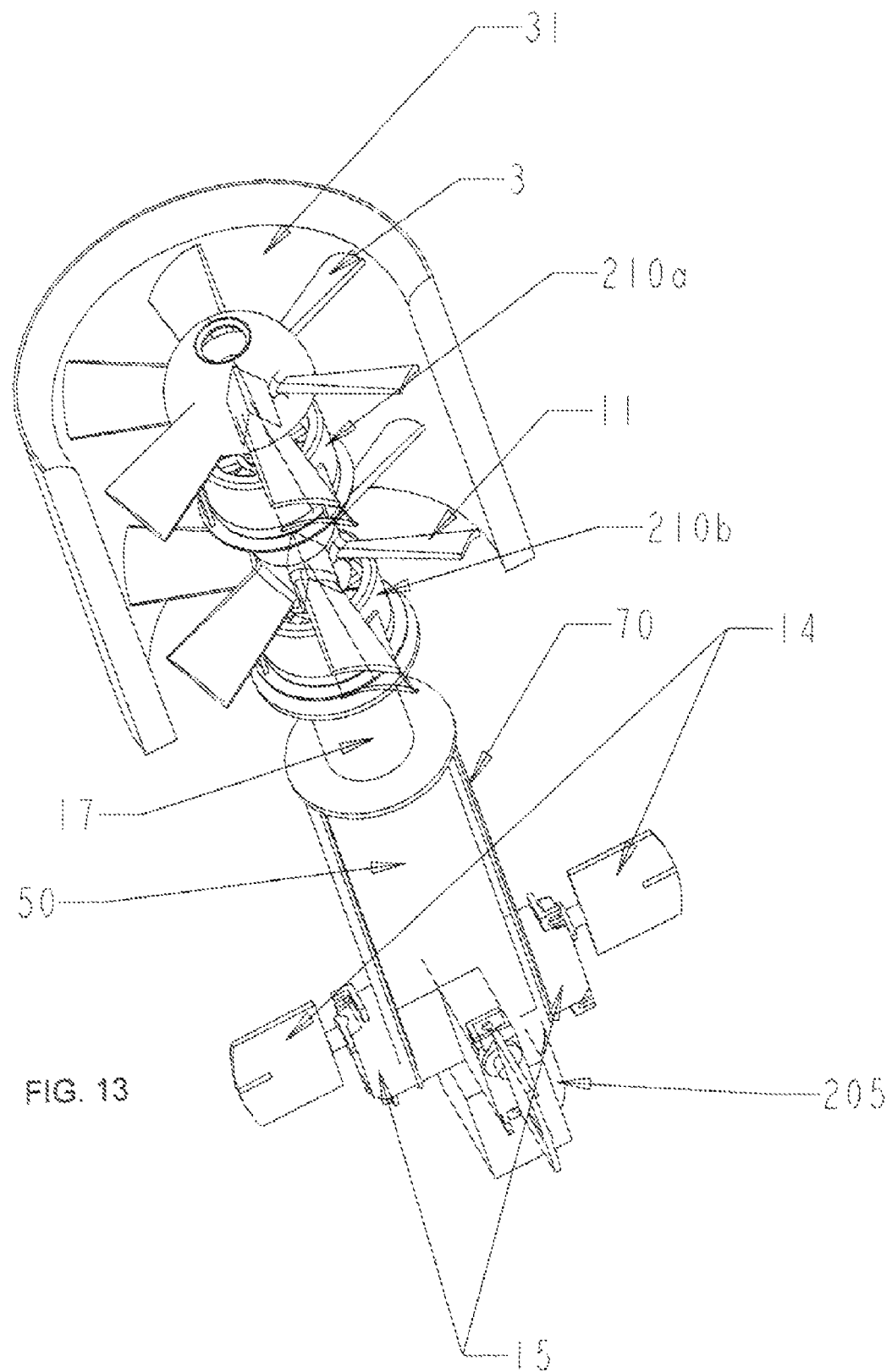
FIG. 13 is an internal perspective view of another embodiment of an aerial robot with an elongated empennage tube.

Further, using flight control surfaces located at a large distance (e.g., at least one housing 25 diameter) from the center of gravity of the airframe as shown in FIG. 13 allows the use of small flight control surfaces (e.g., control fins 14). Likewise, because the inertial masses of the highest-weight elements (housing 25, servomotors 15, and transformer 205) are located at significant distances (e.g., at least one housing 25 diameter) from the center of gravity, the entire system of the aerial robotic lifting and observational platform 1 exhibits a much lower resonant frequency than when inertial masses and flight control surfaces are near the center of gravity. Any tendency of the aerial robotic lifting and observational platform 1 to become unstable occurs much more slowly, and simplified flight control algorithms and actuators can be used without resorting to the complexities of non-linear control theory, and the like, that may be necessary otherwise. For example, the principles embodied in FIG. 13 may allow simple proportional/integral/differential (PID) flight control computations for each flight control axis.

Embodiments of the aerial robotic lifting and observational platform 1 may used in a variety of ways. A number of examples, which are not limiting, are mentioned below. In one aspect, the aerial robotic lifting and observational platform 1 may be equipped with a radio broadcast antenna and raised into the air to provide a temporary radio tower. The aerial robotic lifting and observational platform 1 may include a light and provide a temporary, portable light tower. The aerial robotic lifting and observational platform 1 may aid search and rescue operations. For example, the aerial robotic lifting and observational platform 1 may be equipped with cameras or other imagers that may provide visual data to search crews without subjecting personnel to potentially dangerous environments or circumstances. The aerial robotic lifting and observational platform 1 may also include sniffers or other sensors that detect chemical or biological agents and local atmospheric conditions. The sensors may, for example, detect carbon dioxide levels, carbon monoxide levels, hydrogen sulfide levels, or any other safe, noxious, or toxic fumes. The aerial robotic lifting and observational platform 1 may include sensors measuring temperature, pressure, or other conditions. The aerial robotic lifting and observational platform 1 may also provide one-way or two-way communication between parties in remote locations, such as rescuers and victims, or police and hostages. The aerial robotic lifting and observational platform 1 may deliver items from one party to another. For example, the aerial robotic lifting and observational platform 1 may hold and deliver a telephone, first-aid supplies, weapons, or other items. Accordingly, the aerial robotic lifting and observational platform 1 may include a holder, such as a box, arm, or other attached delivery device. Holder 23, as shown in FIG. 2, could deliver a first aid package, cell phone, or other needed emergency article to a victim in distress. Conversely, such a holder could carry a remotely detonated munitions device, or electrical stun device, to immobilize a hostile adversary. Police, fire, SWAT, and military teams may use the aerial robotic lifting and observational platform 1 to find safe entry areas, victims, suspects, etc. The aerial robotic lifting and observational platform 1 may be used to assess or inspect threats without exposing personnel. The aerial robotic lifting and observational platform 1 could comprise an ordinance delivery tool to immobilize suspects or others. For example, the aerial robotic lifting and observational platform 1 could deliver tear gas, tasers, grenades, or other ordinances. In some aspects, the aerial robotic lifting and observational platform 1 could provide security by monitoring a stationary area or patrolling a perimeter. The aerial robotic lifting and observational platform 1 could provide aerial traffic information or be used for television, movies, and sports events, when equipped with a camera or other observation device.

The preceding description has been presented only to illustrate and describe certain aspects, embodiments, and examples of the principles claimed below. It is not intended to be exhaustive or to limit the described principles to any precise form disclosed. Many modifications and variations are possible in light of the above teaching and are considered within the scope of this disclosure. The scope of the principles described is defined by the following claims. Although this disclosure has been described in terms of certain embodiments and generally associated methods, alterations and permutations of these embodiments and methods will be apparent to those skilled in the art. Accordingly, the above description of example embodiments does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. An aerial robot comprising:
    a body;
    a plurality of sensors for detecting different types of environmental aspects associated with the aerial robot including orientation information and images of an observed area;
    a first propeller coupled to the body and operable to provide thrust to the aerial robot;
    a conductive filament that is operable to be coupled with a remote power supply, operable to be dispensed from the aerial robot, operable to provide power to the first propeller, and operable to transmit images of the observed area to a ground station; and
    a controller that dynamically adjusts, independent of the remote power supply, operational aspects of the aerial robot in response to the orientation information detected by at least one of the plurality of sensors.

2. The aerial robot of claim 1 configured to maneuver in three-dimensional space.

3. The aerial robot of claim 1, the conductive filament comprising a pair of small diameter conductor wires and operable to provide bi-directional communications between the aerial robot and the remote power supply, each wire coated in a flexible dielectric material.

4. The aerial robot of claim 3, the conductive filament further comprising an optical fiber.

5. The aerial robot of claim 3, the conductive filament further comprising a flexible support member.

6. The aerial robot of claim 1 further comprising at least one high energy density battery that provides supplemental power to the aerial robot.

7. The aerial robot of claim 1 further comprising a spool, the conductive filament operable to be dispensed from the aerial robot via the spool.

8. The aerial robot of claim 7, the spool larger than the body in at least one dimension.

9. The aerial robot of claim 7, the spool coupled to the aerial robot in an axially symmetric location.

10. The aerial robot of claim 7, the spool located below the first propeller.

11. The aerial robot of claim 10 further comprising an inner lower exhaust cone, the spool located within the exhaust cone such that the filament is dispensed from a central annulus of the exhaust cone.

12. The aerial robot of claim 7 further comprising tension control means for providing tension to the filament as it dispenses.

13. The aerial robot of claim 12, the tension control means being remotely adjustable.

14. The aerial robot of claim 13, the spool configured to be quickly disconnected from the aerial robot.

15. The aerial robot of claim 7, the filament being between 1000 feet and 5280 feet in length.

16. The aerial robot of claim 7, the spool operable to automatically collocate its center of gravity in response to a change in the center of gravity of the aerial robot.

17. The aerial robot of claim 7, the spool operable to automatically retrieve a portion of dispensed filament.

18. A remotely powered aerial robot system comprising:
    an aerial robot comprising:
    a body;
    a plurality of sensors for detecting different types of environmental aspects associated with the aerial robot including orientation information and images of an observed area;
    a first propeller coupled to the body and operable to provide thrust to the aerial robot;
    a spool coupled to the body;
    a conductive filament that is dispensed from the spool and transmits images of the observed area to a ground station; and
    a controller that dynamically adjusts, independent of the remote power source, operational aspects of the aerial robot in response to at least the orientation information detected by at least one of the plurality of sensors; and a power source coupled with, and remote from, the aerial robot via the conductive filament, the conductive filament operable to power the first propeller using power from the power source.

19. The system of claim 18, the aerial robot configured to maneuver in three-dimensional space.

20. The system of claim 18, the conductive filament comprising a pair of small diameter conductor wires and operable to provide bi-directional communications between the aerial robot and the remote power supply, each wire coated in a flexible dielectric material.

21. The system of claim 18, the remote power source comprising a ground power source.

22. The system of claim 18, the remote power source further operable to provide control of the aerial robot and visualization of data associated with the aerial robot.

23. The system of claim 18, the remote power source comprising joysticks for the control and a port for a client device for the data visualization.

24. The system of claim 18, the aerial robot comprising a first aerial robot and the system further comprising a second aerial robot with a second spool and a second conductive filament, the remote power source further operable to the second aerial robot via the second conductive filament.

25. The system of claim 18, the remote power source comprising one or more of the following:
   internal battery power;
   distributed battery power;
   a generator; and
   AC main power.

26. The system of claim 25, the remote power source generating high voltage power for the aerial robot, the high voltage power comprising one of AC power or DC power.

27. The system of claim 26, the aerial robot operable to convert the high voltage power for use by the first propeller.

28. The system of claim 26, the aerial robot further comprising a high voltage motor for the first propeller, the motor compatible with the high voltage power.

29. The system of claim 18, the spool comprising a rotatable spool and the filament dispensed by rotation of the spool in one direction and retrieved by rotation of the spool in another direction.

* * * * *